US012790145B2

(12) United States Patent
Kalavathi et al.

(10) Patent No.: US 12,790,145 B2
(45) Date of Patent: Nov. 10, 2026

(54) FLOATING HOOK VEHICLE RESTRAINT SYSTEM

(71) Applicant: MULTI-FAB PRODUCTS, LLC, Menomonee Falls, WI (US)

(72) Inventors: Sunil Kalavathi, Sheboygan, WI (US); Todd Mervin, Brookfield, WI (US)

(73) Assignee: Multi-Fab Products, LLC, Menomonee Falls, WI (US)

( * ) Notice: Subject to any disclaimer, the term of this patent is extended or adjusted under 35 U.S.C. 154(b) by 232 days.

(21) Appl. No.: 18/817,857

(22) Filed: Aug. 28, 2024

(65) Prior Publication Data

US 2025/0091825 A1 Mar. 20, 2025

Related U.S. Application Data

(60) Provisional application No. 63/583,026, filed on Sep. 15, 2023.

(51) Int. Cl.
*B65G 69/00* (2006.01)

(52) U.S. Cl.
CPC .................................. *B65G 69/003* (2013.01)

(58) Field of Classification Search
CPC ........................... B65G 69/003; B65G 69/287; B65G 69/2882; F16B 45/053; F16B 45/045; F16B 45/02; F16B 45/04; F16B 45/06; B66C 1/34; B66C 1/36; B62D 53/0842
See application file for complete search history.

(56) References Cited

U.S. PATENT DOCUMENTS

| | | | | | |
|---|---|---|---|---|---|
| 4,560,315 | A * | 12/1985 | Hahn | B65G 69/003 | 14/71.1 |
| 4,648,781 | A * | 3/1987 | Sikora | B65G 69/003 | 414/584 |
| 6,162,005 | A * | 12/2000 | Fritz | B65G 69/003 | 414/401 |
| 6,190,109 | B1 * | 2/2001 | Bender | B65G 69/003 | 414/401 |
| 6,431,819 | B1 * | 8/2002 | Hahn | B65G 69/003 | 414/401 |
| 7,146,673 | B1 * | 12/2006 | Digmann | B65G 69/2876 | 14/71.1 |
| 8,523,253 | B1 * | 9/2013 | Yustus | B66C 1/36 | 294/82.21 |
| 8,596,949 | B2 * | 12/2013 | Harrington | B65G 69/003 | 414/401 |
| 9,969,598 | B1 * | 5/2018 | Oropeza | B65G 17/16 | |
| 10,329,104 | B2 * | 6/2019 | Kosek | B65G 69/003 | |
| 10,377,586 | B2 * | 8/2019 | Yule | B65G 67/02 | |
| 10,569,978 | B2 | 2/2020 | Gleason | | |
| 10,589,944 | B2 | 3/2020 | Mushynski et al. | | |
| 10,689,213 | B2 * | 6/2020 | Mushynski | B65G 69/003 | |
| 10,745,220 | B2 * | 8/2020 | Schlintz | B65G 69/003 | |

(Continued)

*Primary Examiner* — Saul Rodriguez
*Assistant Examiner* — Jaimin G Patel
(74) *Attorney, Agent, or Firm* — Dority & Manning, P.A.

(57) ABSTRACT

The present hook-based vehicle restraining system is capable of reducing the effects of RIG wedge or forced hook rotation in the disengaging direction. A cam located within a hook pocket inside of the hook allows the hook to move translationally in cases of RIG wedge, thereby dislodging the hook. At least one transition stop contacts the hook to prevent the hook from rotating beyond the transition stop, thereby preventing the hook from being forced downwards.

20 Claims, 26 Drawing Sheets

(56) References Cited

U.S. PATENT DOCUMENTS

| | | | | |
|---|---|---|---|---|
| 10,781,062 | B2 * | 9/2020 | Gadbois | B65G 69/003 |
| 10,906,759 | B2 * | 2/2021 | Schlintz | B65G 69/003 |
| 10,988,329 | B2 * | 4/2021 | Whitley | B65G 69/003 |
| 11,478,389 | B2 * | 10/2022 | Pettigrew | A61G 3/0808 |
| 11,618,642 | B2 * | 4/2023 | Whitley | B65G 69/003 414/401 |
| 11,945,694 | B1 * | 4/2024 | Gilfillan | F16G 15/06 |
| 2005/0196255 | A1 * | 9/2005 | Sveum | B65G 69/003 414/401 |
| 2008/0095598 | A1 * | 4/2008 | Cotton | B65G 69/003 414/584 |
| 2013/0017045 | A1 * | 1/2013 | Brooks | B65G 69/003 414/401 |
| 2015/0210487 | A1 * | 7/2015 | Brooks | B65G 69/003 414/401 |
| 2015/0217951 | A1 * | 8/2015 | Lessard | B65G 69/003 414/401 |
| 2017/0066607 | A1 * | 3/2017 | Muhl | B65G 69/003 |
| 2018/0029844 | A1 * | 2/2018 | Franke | B66C 1/34 |
| 2019/0119055 | A1 * | 4/2019 | Schlintz | B65G 69/003 |
| 2023/0159304 | A1 * | 5/2023 | Ercilla Lecea | B66C 1/36 414/10 |

* cited by examiner

FLOATING HOOK VEHICLE RESTRAINT SYSTEM

CROSS-REFERENCE TO RELATED APPLICATIONS

This application claims the benefit of prior-filed, U.S. Provisional Patent Application No. 63/583,026, filed on Sep. 15, 2023, the contents of which are incorporated herein by reference in their entirety.

BACKGROUND

This invention relates to a hook system, specifically a hook system capable of restraining a vehicle trailer during loading and unloading.

If a vehicle trailer is removed prematurely from a loading dock, the trailer may still contain workers or a fork truck and operator. Worse, the trailer may be removed when the workers or fork truck are transitioning from the loading dock to the trailer. Either action can cause workers or the fork truck and operator to fall from the trailer or impact a trailer wall, resulting in significant injury to persons and damage to property.

To prevent premature removal, a vehicle restraint on the loading dock is moved into an operable position by the trailer backing up to the loading dock and contacting the restraint. Once the trailer is in position, a loading dock attendant engages the restraint which in turn rotates a vehicle restraining hook in the restraint such that the hook engages the rear impact guard bar, or RIG bar, of the trailer. Once engaged, the hook prevents the RIG bar and therefore the trailer from being removed from the loading dock until properly released by the dock attendant.

The hook in these restraints is generally operated via electromechanical means, usually an electric motor coupled to a shaft rotational speed reducer such as a gear-based drivetrain and/or sprockets and chain. Included in the drivetrain is usually a clutch or brake to allow for slip to prevent damage to the drivetrain when the restraining hook is pulled by a RIG bar. The hook still allows for some limited horizontal motion of the RIG bar and trailer in the engaged position. It is not until the RIG bar is moved sufficiently away from the loading dock that the hook captures the RIG bar and prevents further horizontal motion. This horizontal motion can occur for a number of reasons including the momentum transfer of the fork truck stopping and starting in the trailer or entering or exiting the trailer, especially if the brakes of the trailer have not been properly set, or the truck driver driving away prematurely.

After the RIG bar is captured, horizontal movement of the trailer may move the hook to its furthest point away from the loading dock, with the RIG bar gaining contact with the hook at one point on the upper portion of the RIG bar and one point on the lower portion of the RIG bar. In this position, the hook has been pulled and rotated by the RIG bar into the most forward and lowest position in which the hook can reliably capture the RIG bar. At this point, the hook may become locked or wedged in place on the RIG bar, a state known as RIG wedge, preventing the system's electromechanical means from lowering the hook to allow release of the trailer. Such situations may occur, for example, when the engaged truck pulls forward during loading and unloading.

In other situations, a RIG bar may have an attached plate which prevents the hook from finding proper purchase around the RIG bar. In this case, only the tip of the hook may make contact. As a result, horizontal movement of the trailer may force the hook to move downwards and out of contact with the RIG bar, resulting in the hazardous conditions that the hook system was intended to prevent.

At other points of hook rotation, the hook may be extended too high to catch the RIG bar or the hook was deployed before the truck backed up into the acceptable operating range. During such points, sensors typically alert drivers and workers that the trailer should not approach the loading dock. Any modifications to the hook system would have to accommodate such sensor safety measures.

There is an unmet need in the art for a hook-based vehicle restraining system capable of reducing the effects of RIG wedge or forced hook rotation in the disengaging direction.

BRIEF SUMMARY OF THE INVENTION

An embodiment of the present invention is a vehicle restraining hook system including a carriage with a rotatable shaft extending therethrough, a cam rotatably fixed to the shaft, and a floating hook subassembly. The floating hook subassembly includes a left-side hook half and a right-side hook half. Each of the left-side hook half and the right-side hook half includes hook load surfaces configured to contact a RIG bar at a first end, and a void configured to receive the cam at a second end. The void of the left-side hook half and the void of the right-side hook half form a single continuous hook pocket configured to retain the cam but allow the hook shaft to extend therethrough. The floating hook subassembly is rotatable relative to the carriage about the rotatable shaft in an engaging direction and a disengaging direction. The cam is rotatable within the hook pocket such that rotation of the cam causes linear motion of the floating hook subassembly.

The objects and advantages of the invention will appear more fully from the following detailed description of the embodiments of the invention and examples.

It should be understood that for clarity, not all elements are numbered in all figures. Lack of labeling should not be interpreted as an element missing from a figure.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Figure 2:
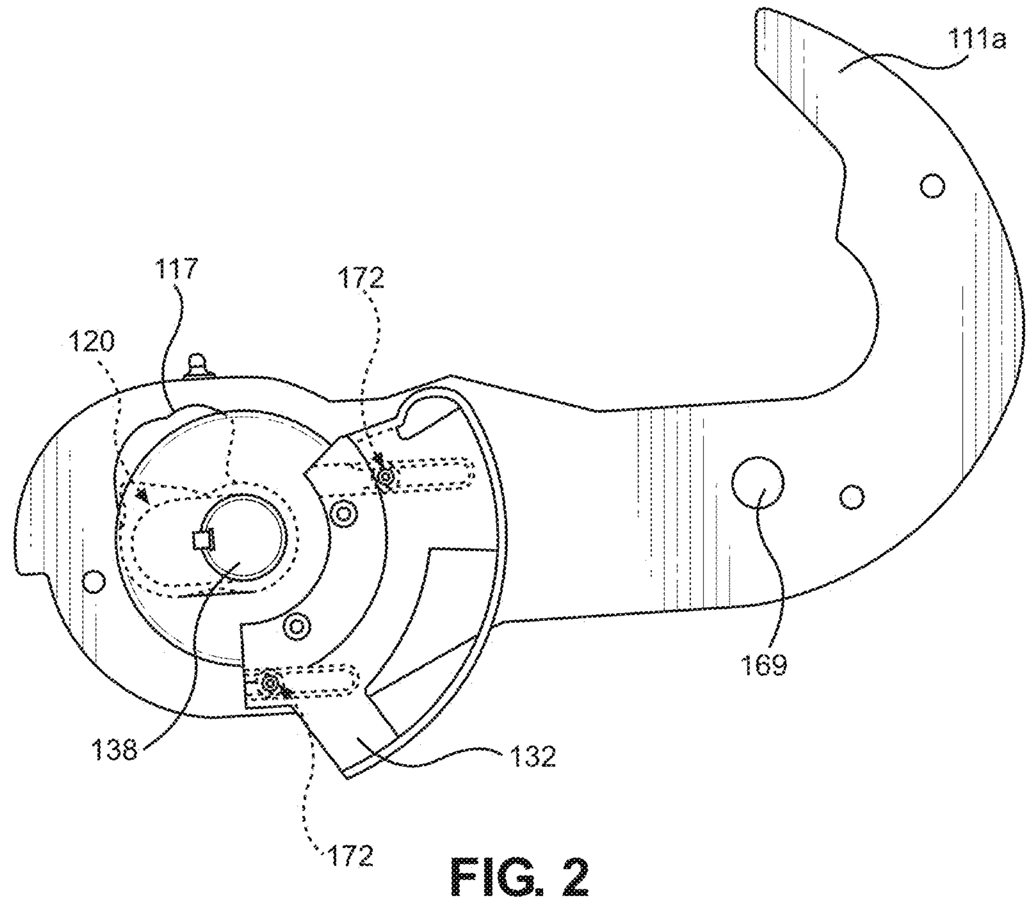
FIG. 2 shows a left side view of the first exemplary embodiment of a floating hook sub-assembly.
Figure 3:
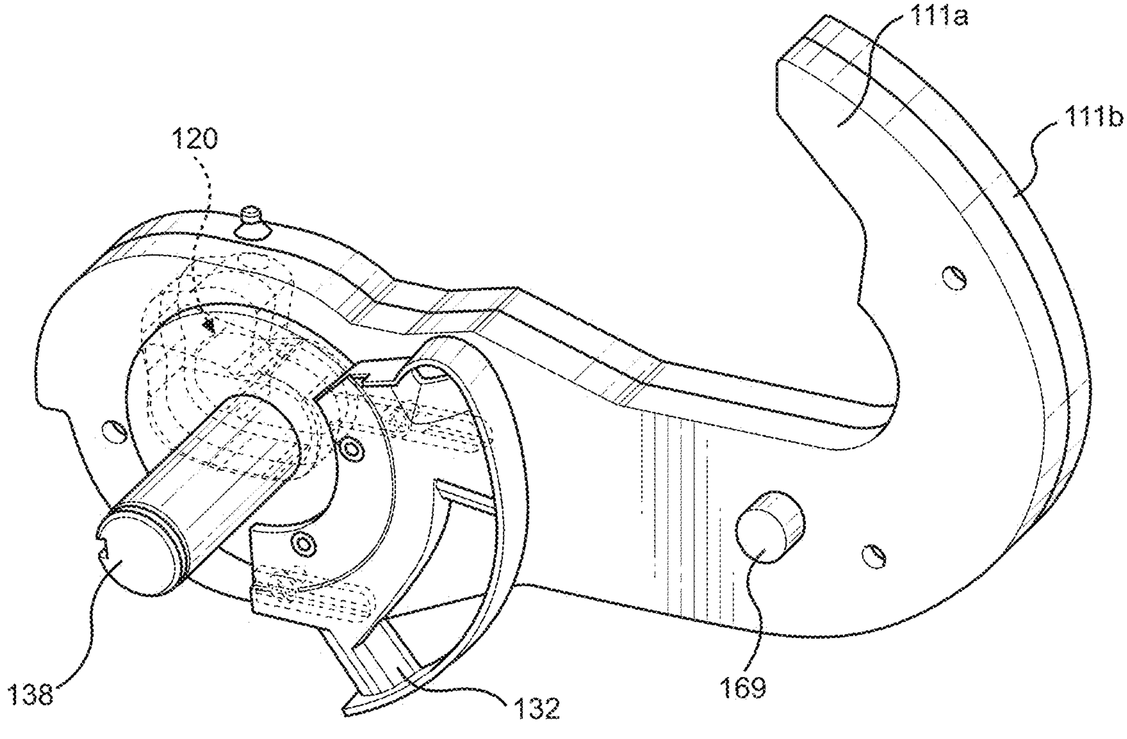
FIG. 3 shows a left perspective view of the first exemplary embodiment of the floating hook sub-assembly.
Figure 4:
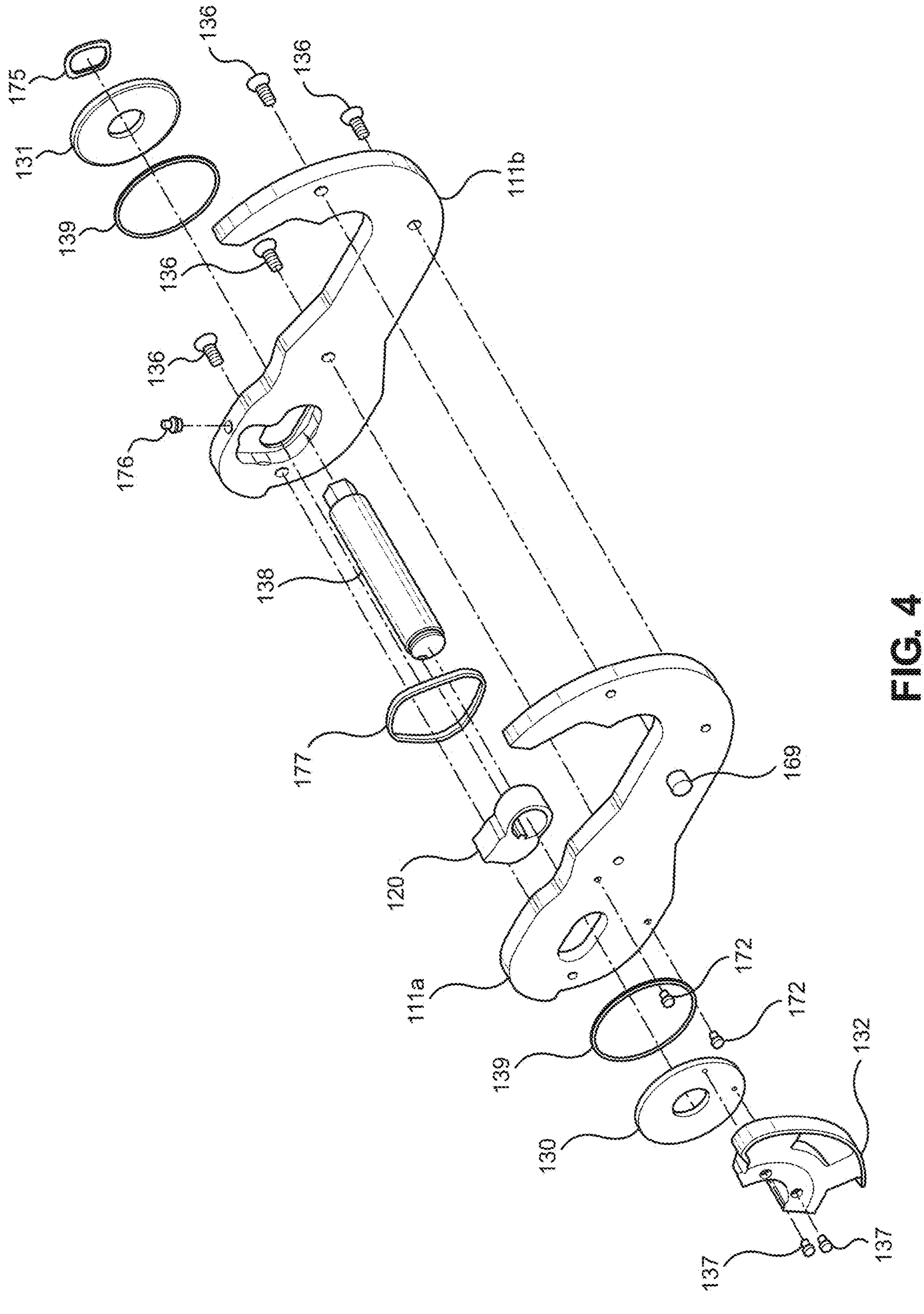
FIG. 4 shows an exploded perspective view of the first exemplary embodiment of the floating hook sub-assembly.
Figure 13:
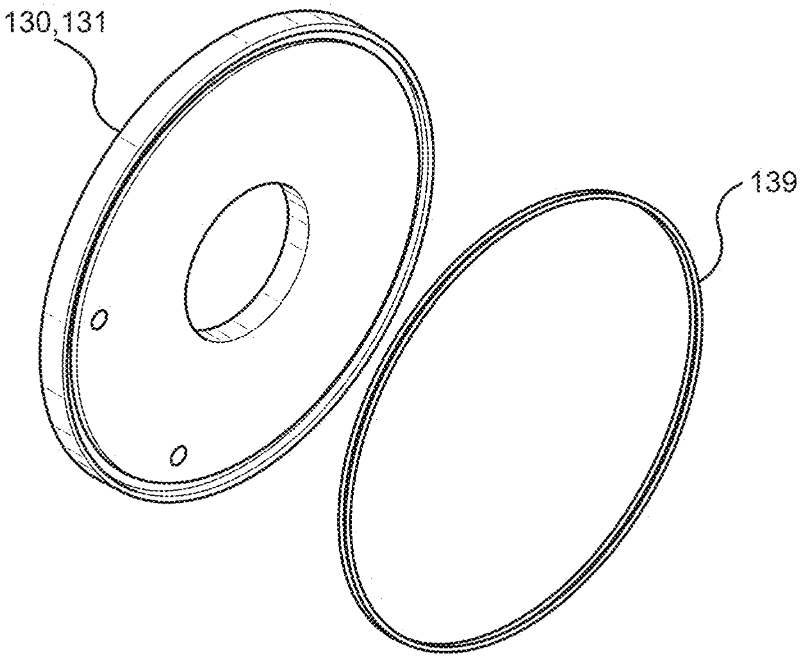
FIG. 13 shows an exploded perspective view of the first exemplary embodiment of side plates with O-rings.

As shown in FIGS. 2-4, the sub-assembly forming the floating hook 110 used in the system 100 includes a left-side hook half 111*a*, a right-side hook half 111*b*, and a cam 120. The left-side hook half 111*a* and right-side hook half 111*b* can be mirror images of each other. During assembly, the cam 120 slides on to a main shaft 138 and is sandwiched between the left side hook cam locking surface 115*a* and right-side hook cam locking surface 115*b*. The cam 120 is locked in place with respect to rotation on the main shaft 138, but is free to rotate within the hook pocket 117, the void formed between the left-side and right-side hook halves 111*a* and 111*b*. The two hook halves 111*a* and 111*b* (with the cam 120 in-between) are held together with hook bolts 136. The hook halves 111*a* and 111*b* (again, with the cam 120 in-between) are also supported on either side with a left side plate 130 and a right side plate 131 holding O-rings 139 as shown in FIG. 13. A hook position indicator 132 is attached to the left side or right side plates 130 or 131 using hook position indicator bolts 137 as shown in FIG. 4; the floating hook 110 is also aligned to the hook position plate 132 using hook position indicator slide bolts 172.

Figure 1:
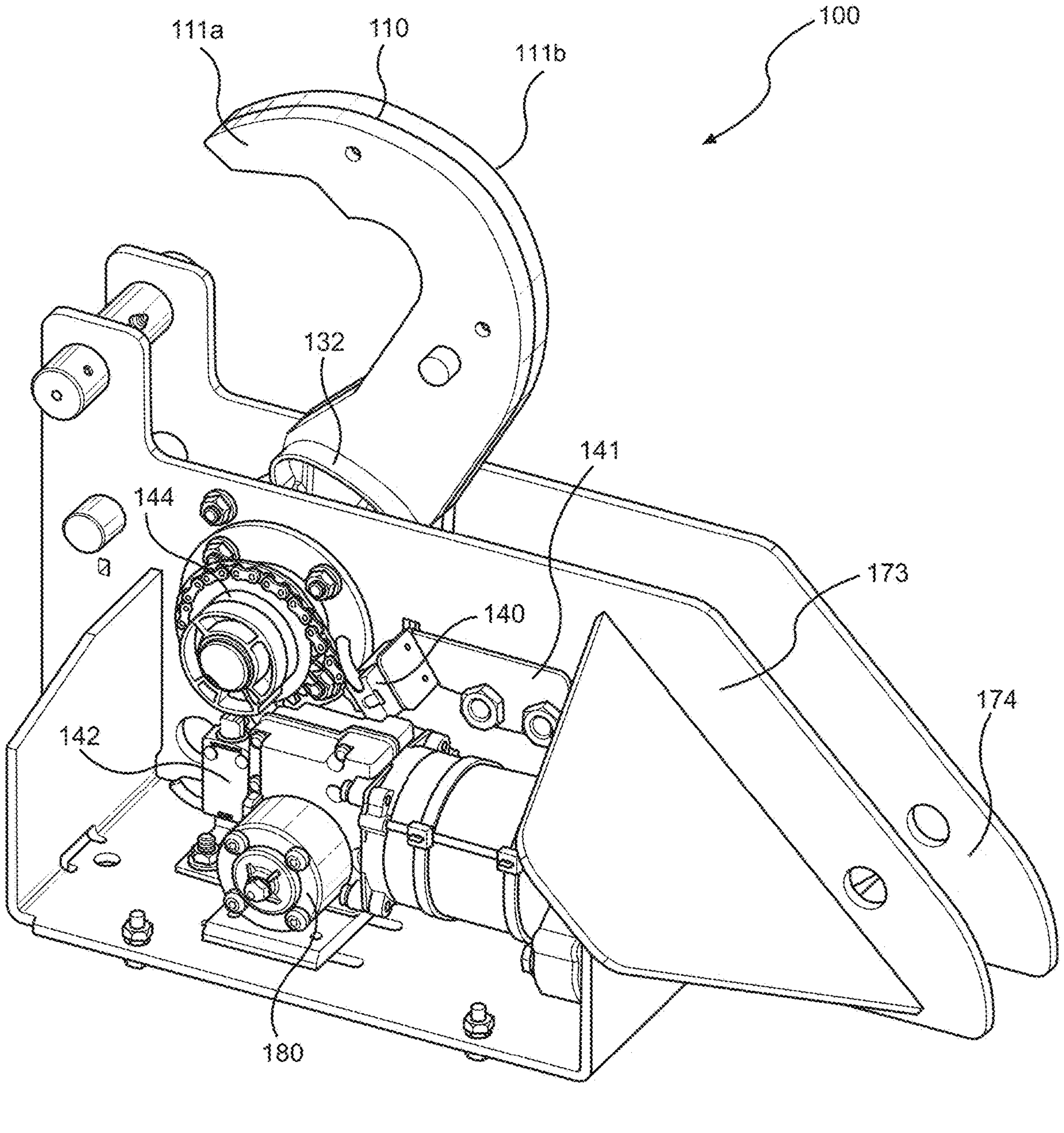
FIG. 1 shows a perspective view of a first exemplary embodiment of a floating hook vehicle restraint system.
Figure 5:
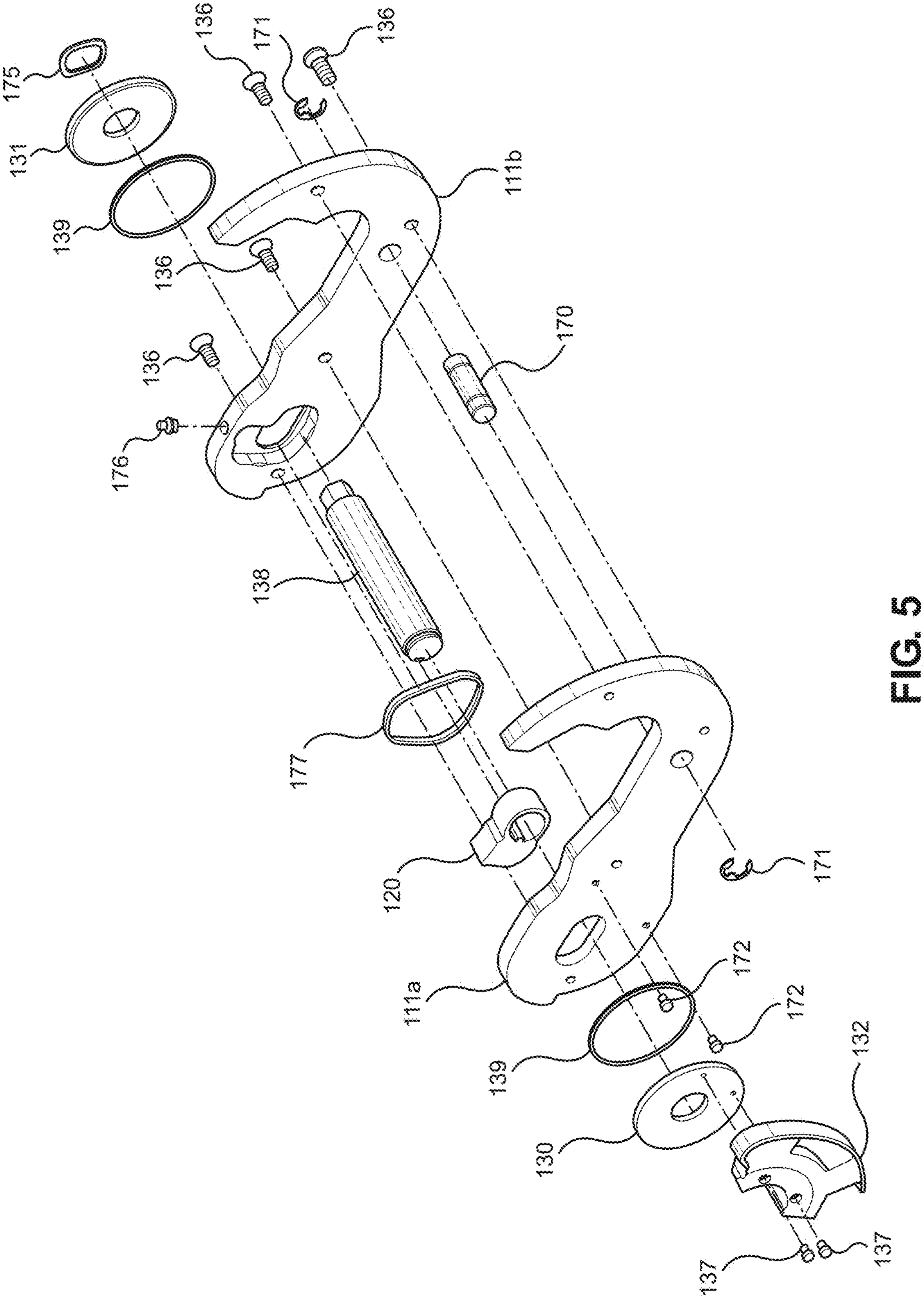
FIG. 5 shows a perspective view of a second exemplary embodiment of the floating hook sub-assembly.

The floating hook 110 is centered between a carriage comprised of a left carriage plate 173 and a right carriage plate 174 as shown on FIG. 1 and is pressed tight with a spring washer 175 as shown in FIG. 4. In one embodiment, the left-side hook half 111*a* has an integral or welded outward-projecting hook stopper 169 as shown in FIG. 2. The right-side hook half 111*b* may also have a similarly-structured outward-projecting hook stopper 169 (not shown). In an alternative embodiment, the hook stopper 169 is made up of a pin 170 with retaining rings 171 on either side that passes through both the left- and right-side hook halves 111*a* and 111*b* as shown on FIG. 5. This allows replacement of a damaged hook stopper 169 without requiring replacement of the entire floating hook 110.

The inner cam engagement surface 123 is rotationally fixed to the exterior surface of the main shaft 138. The rotational cam engagement surfaces 121 remain engaged with the rotational hook engagement surfaces 112*a* and 112*b* when the floating hook 110 rotates in an upward direction. The cam 120 is rotationally locked with respect to the shaft 138 but rotates freely (within its designated range of rotation) inside the restricted hook pocket 117, a void caused due to joining the left- and right-side hook halves 111*a* and 111*b* together, causing the floating hook 110 to freely rotate down with rotational cam engagement surfaces 121 always in contact with rotational hook engagement surfaces 112*a* and 112*b*. Because the hook pocket 117 has a roughly L-shaped configuration, the cam 120 may rotate within the hook pocket 117 through a range of approximately 90 degrees. The peripheries of the hook pocket 117 and the cam 120 are configured to allow the cam 120 to rotate through the range while having positive contact with at least two surface points of the hook pocket 117 at both starting and end positions. Because of this, the axis of rotation of the cam 120 is identical to the longitudinal axis and axis of rotation of the main shaft 138.

Figure 11:
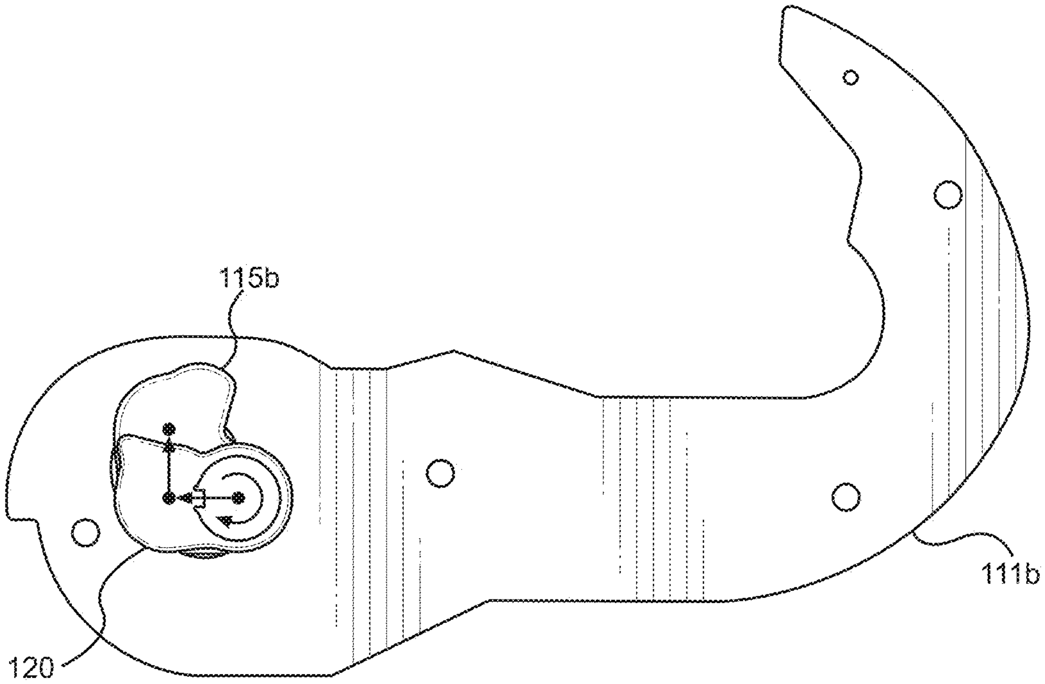
FIG. 11 shows a perspective view of the first exemplary embodiment of the cam in down position inside the hook.
Figure 12:
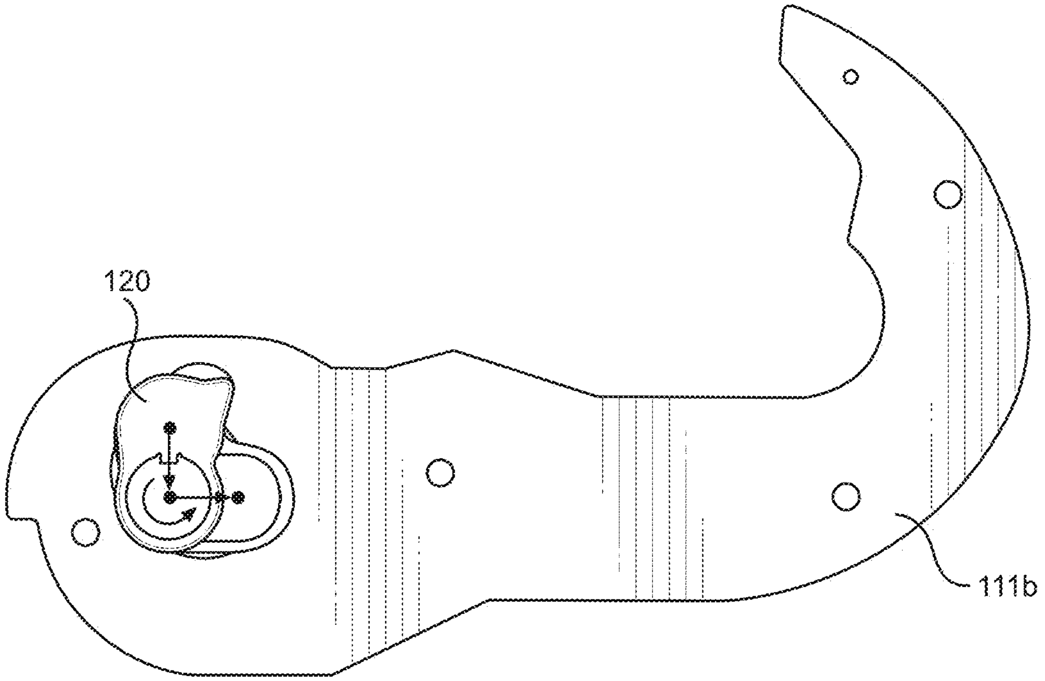
FIG. 12 shows a perspective view of the first exemplary embodiment of the cam in up position inside the hook.
Figure 28:
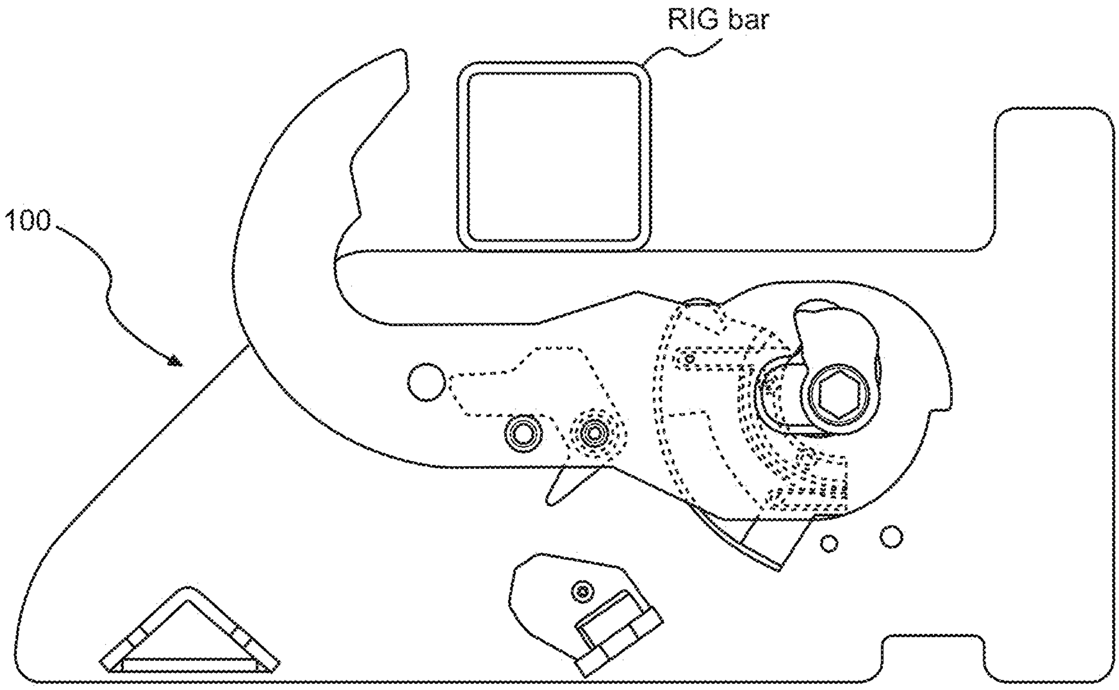
FIG. 28 shows a right side view of the first exemplary embodiment of a disengage position from RIG wedge for the square RIG bar where the hook is free to fall.
Figure 29:
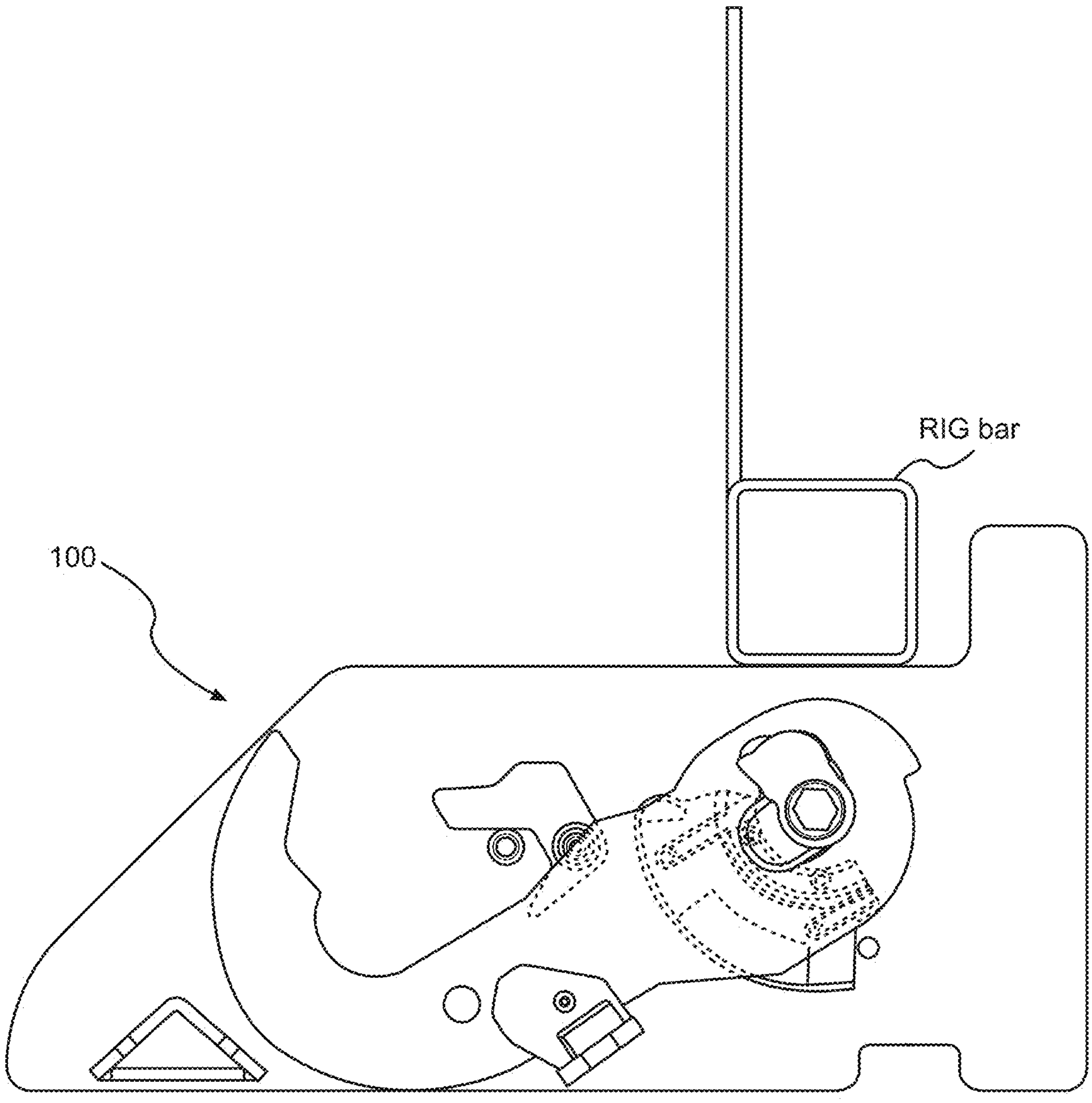
FIG. 29 shows a right side view of the first exemplary embodiment of a stored position with a square RIG bar with a plate.
Figure 30:
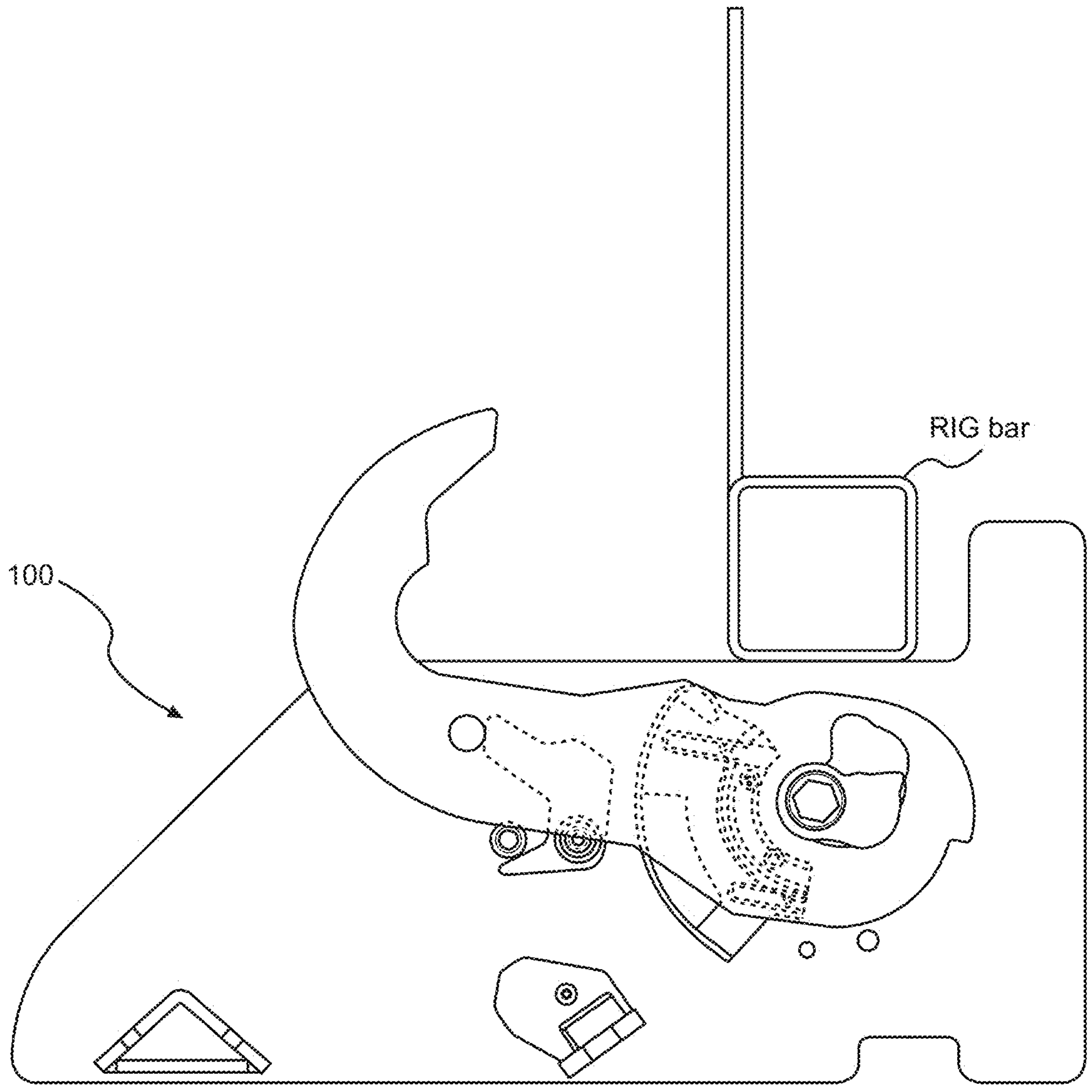
FIG. 30 shows a right side view of the first exemplary embodiment of a transition position with a square RIG bar with a plate.
Figure 38:
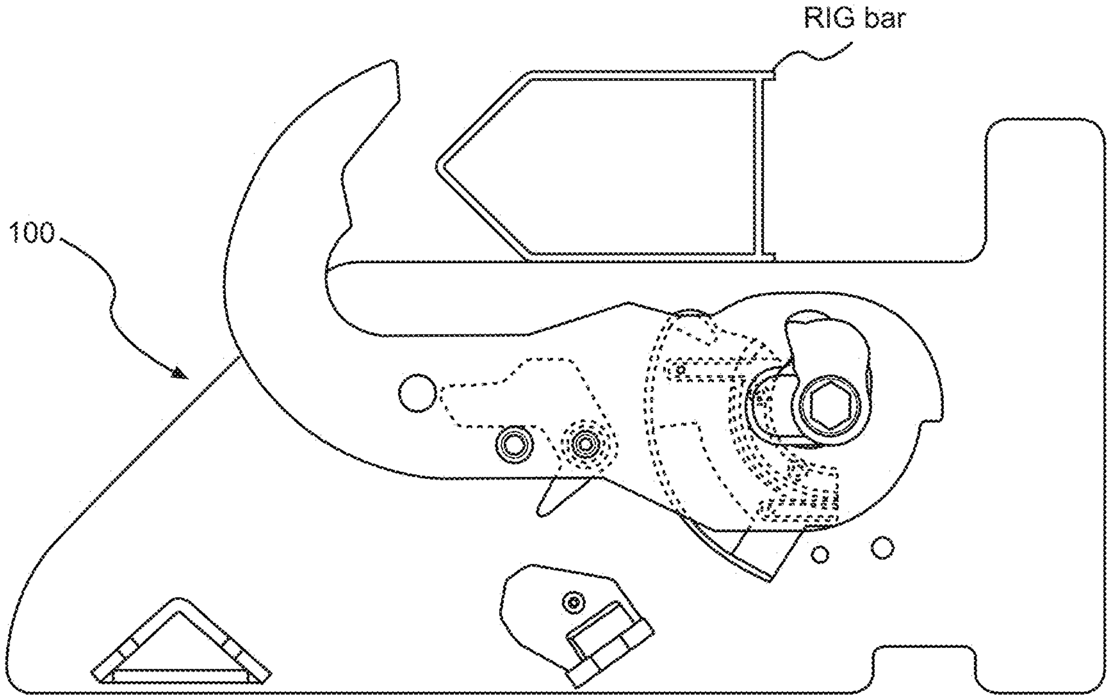
FIG. 38 shows a right side view of the first exemplary embodiment of a disengage position from RIG wedge for the penta RIG bar where the hook is free to fall.

During RIG wedge, as discussed above, a load is applied on the hook load surfaces 116*a* and 116*b* causing the floating hook 110 to not rotate or lock in place. Since cam 120 is floating inside the hook pocket 117, the cam 120 may rotate freely inside the hook pocket 117 from down position to up position. The rotational cam engagement surfaces 121 slide along the rotational hook engagement surfaces 112*a* and 112*b*, causing the floating hook 110 to slide linearly away from the RIG bar until the translational cam engagement surfaces 122 are against the translational hook engagement surfaces 113*a* and 113*b*. FIG. 11 shows the cam in a "down" position and FIG. 12 shows the cam in an "up" position. Rotation of the cam 120 causes the various engagement surfaces of the cam 120 and the floating hook 110 to slide against each other in a way that may generate linear motion of the floating hook 110 away from the main shaft, as shown in FIGS. 28 and 38. This motion removes one of the two points of contact creating the RIG wedge, allowing the floating hook 110 to slide along the second point of contact until that second contact is also removed. The floating hook 110 does not move in an elliptical pattern at any point; movement is either linear or rotation about the axis of the shaft.

Figure 15:
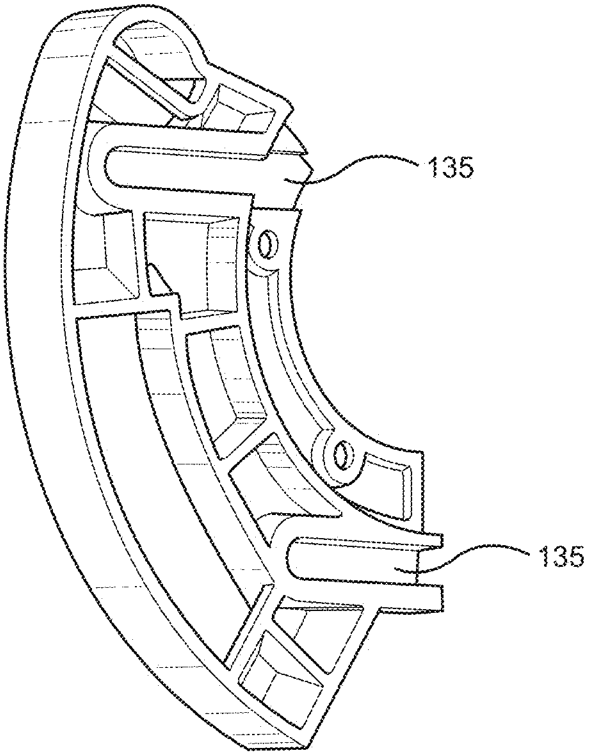
FIG. 15 shows a back perspective view of the first exemplary embodiment of a hook position indicator.

The floating hook 110 may also include a hook split gasket 177 acting as a seal for lubrication inside the hook pocket 117. In certain embodiments, the hook split gasket 177 is at least one O-ring. The lubrication prevents damage to the rotational and translational hook engagement surfaces 112 and 113 and the rotational, translational, and inner cam engagement surfaces 121, 122, and 123 during sliding and rotation. The floating hook 110 also has provision for a vented lubrication zerk 176 to add lubrication fluid for smooth motion and regular service The hook position indicator 132 is always rotationally locked to the rotational orientation of the floating hook 110, but translational movement of the floating hook 110 causes the hook position indicator 132 to rotate without translation due to the channels 135 in the hook position indicator 132. These channels 135 (shown in FIGS. 2 and 15) allow the hook position indicator slide bolts 172 (shown in FIG. 2) to slide freely during the translational movement of the floating hook 110. The hook position indicator 132 may have a plate configuration. The hook position indicator 132 may be made from polymer with beveled edges to prevent damage to a hook position sensor 140 during abrupt positional shifts.

Figure 14:
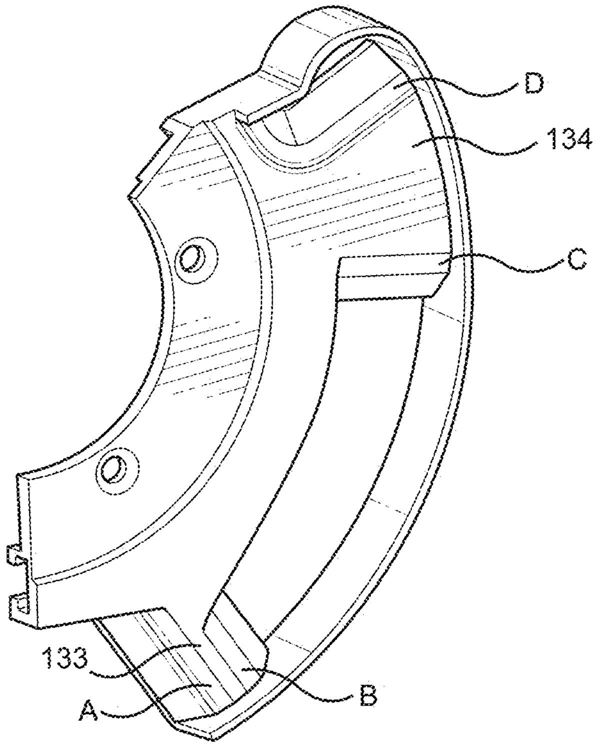
FIG. 14 shows a front perspective view of the first exemplary embodiment of a hook position indicator.

The hook position sensor 140 is held to the left carriage plate 173 using a hook position sensor bracket 141 as shown in FIG. 1. As shown in FIG. 14, the hook position indicator 132 has four different transition points (A, B, C, and D) that trigger the hook position sensor 140 to determine the exact location of the floating hook 110, both rotationally and translationally, to control at least one safety display inside and/or outside of a building. A safety display inside of a building may indicate to workers whether it is safe to load or unload a truck. A safety display outside of a building may indicate to truck drivers whether it is safe to move in for loading/unloading or move out after loading/unloading. In certain embodiments, the display(s) may be visual indicia and/or an audible indication. In embodiments utilizing visual indicia, the visual indicia may be flashing and/or steadily illuminated colored and/or uncolored lights, alphanumeric displays, or any combination thereof. In embodiments utilizing audible indication, the audible indication may be spoken status indicators, alarm bells, sirens, or any combination thereof.

Another sensor, the safe hook position sensor 142, is held to the left or right carriage plate 173 or 174 using safe hook position sensor bracket 143. A hook position actuator 144 having a varying radius is fixedly connected to the main shaft 138 to rotate with the main shaft 138 and hook 110. The radius of the hook position actuator 144 varies such that rotation of the hook position actuator 144 actuates the safe hook position sensor 142 once the floating hook 110 has deployed sufficiently to clear the transition stops 150*a* and 150*b* during the engagement cycle.

When the hook position sensor 140 is above point D, the floating hook 110 is in a completely stored position. When this happens the hook position sensor 140 is not active, which causes the building dock inside display to indicate that no truck is engaged and that it is not safe to load or unload a truck. Concurrently, the building dock outside display indicates that it is safe for a truck to move in or out.

When the hook position sensor 140 is between point D and point C in contact with the incomplete storage sensing surface 134 on the hook position indicator 132, the floating hook 110 is not completely stored and might cause damage if a truck is backed up. When this happens the hook position sensor 140 is active, which causes the safety displays inside and outside of the building to indicate an unsafe condition both for operating inside and for truck engagement on the outside. In certain embodiments, a gear motor 180 may be automatically actuated by the hook position sensor 140 to move the floating hook 110 to a storage position to avoid any damage.

When the hook position sensor 140 is between points C and B, the floating hook 110 is within the operating range and the truck is restrained by the RIG bar. When this happens the hook position sensor 140 is not active, which causes the building dock inside display to indicate that the truck is engaged and it is safe to load or unload. Concurrently, the building dock outside display indicates that it is not safe for the truck to move out or pull out.

When the hook position sensor 140 is between points B and A in contact with the over-rotation sensing surface 133 on the hook position indicator 132, the floating hook 110 has over rotated/traveled beyond the acceptable range. This position is also indicative of an absent truck and/or RIG bar. When this happens the hook position sensor 140 is active, which causes the safety displays inside and outside of the building to indicate an unsafe condition both for operating inside and for truck engagement on the outside. In certain embodiments, the gear motor 180 may be automatically actuated by the hook position sensor 140 to move the floating hook 110 to a storage position to avoid any damage.

Figure 20:
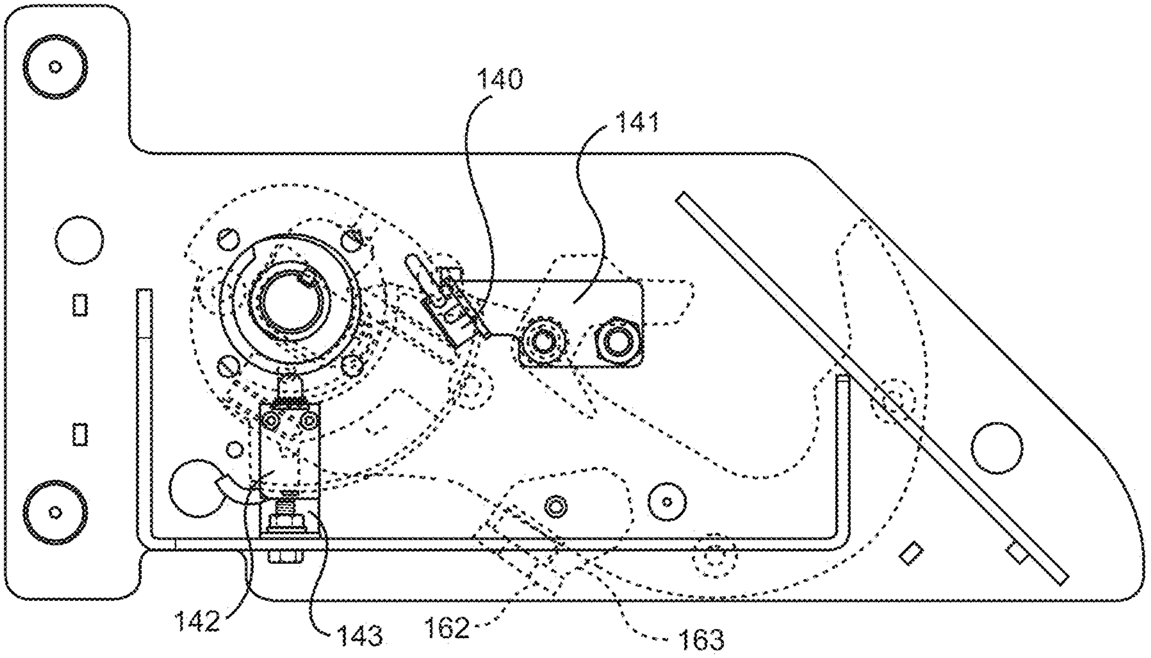
FIG. 20 shows a side view of the first exemplary embodiment of a hook at lower/stored position.
Figure 21:
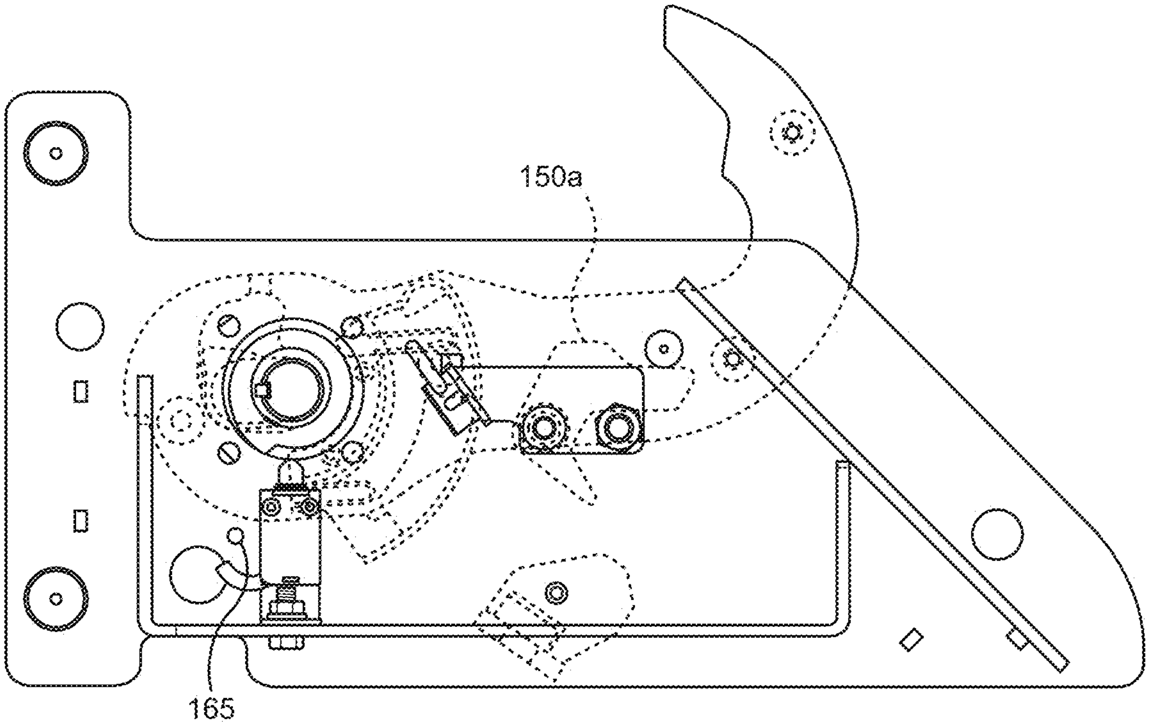
FIG. 21 shows a side view of the first exemplary embodiment of a hook at sliding position (sliding through the translation stop).
Figure 22:
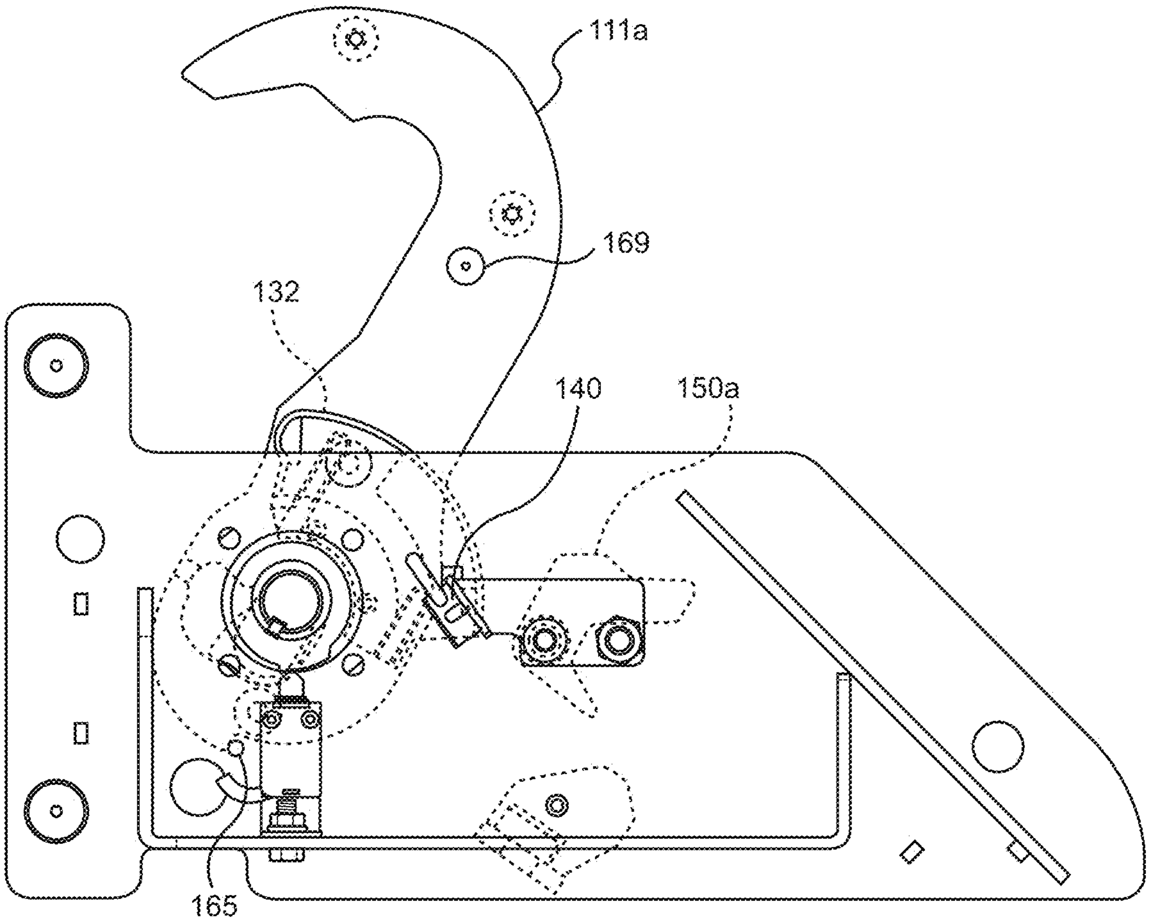
FIG. 22 shows a side view of the first exemplary embodiment of a hook at upper extreme position.
Figure 24:
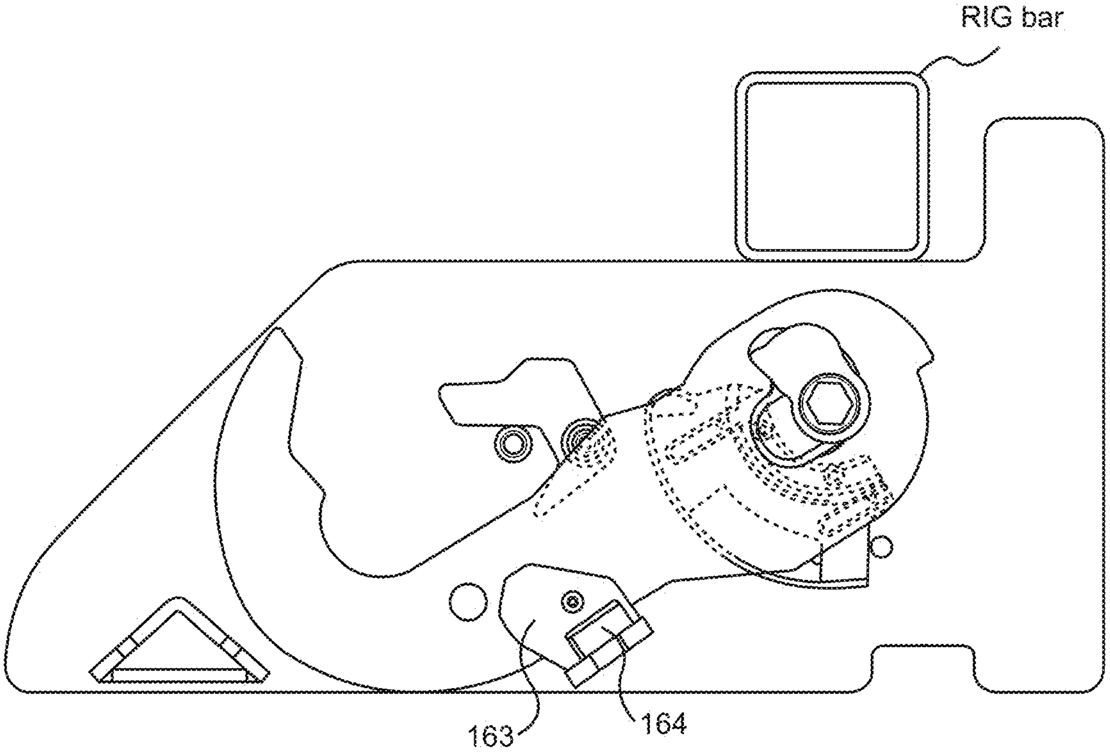
FIG. 24 shows a right side view of the first exemplary embodiment of a stored position with a square RIG bar.
Figure 25:
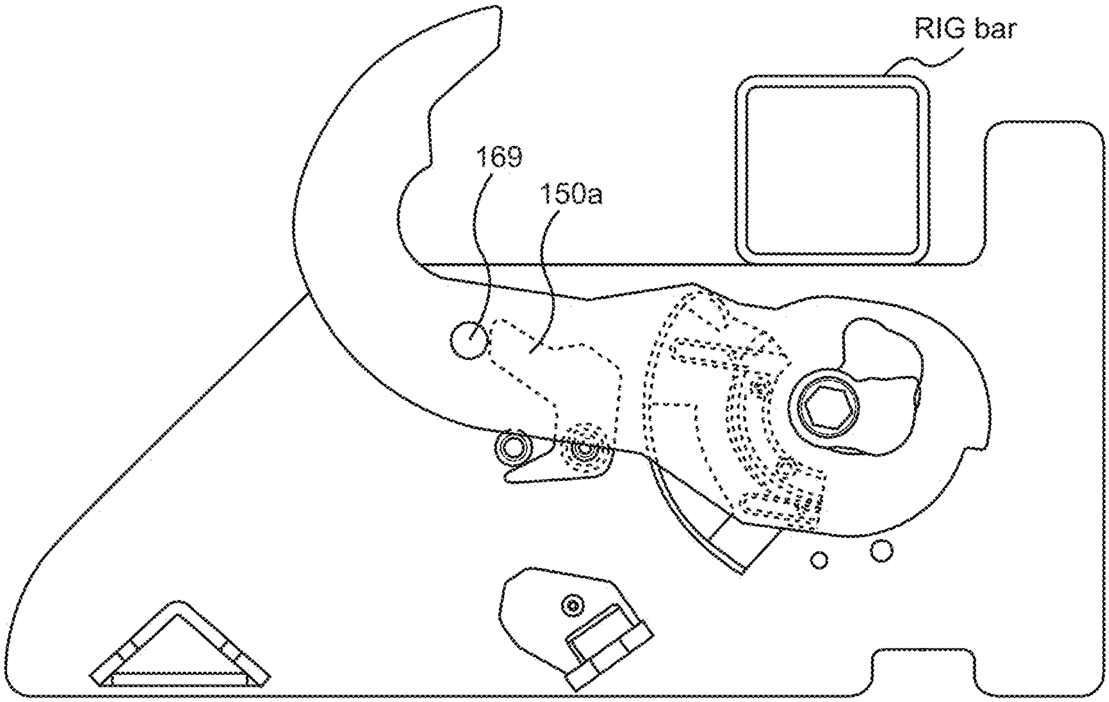
FIG. 25 shows a right side view of the first exemplary embodiment of a transition position with a square RIG bar.
Figure 26:
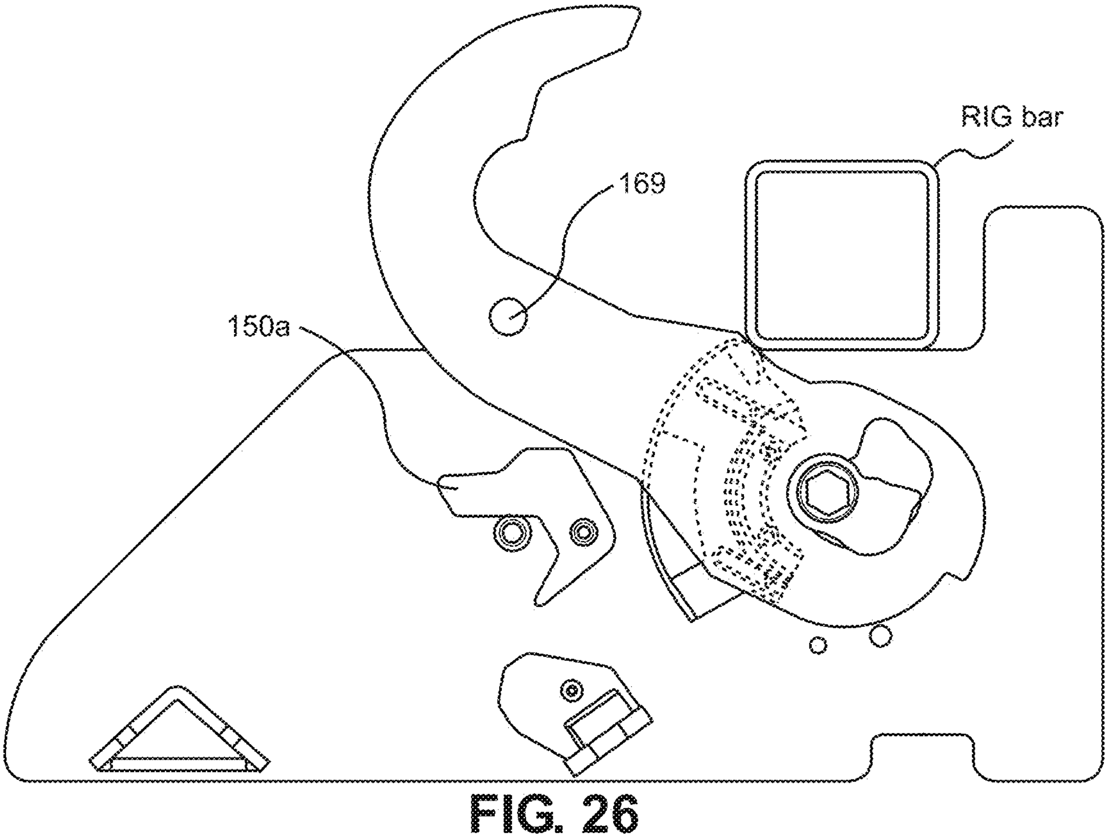
FIG. 26 shows a right side view of the first exemplary embodiment of an engaged position with a square RIG bar.
Figure 27:
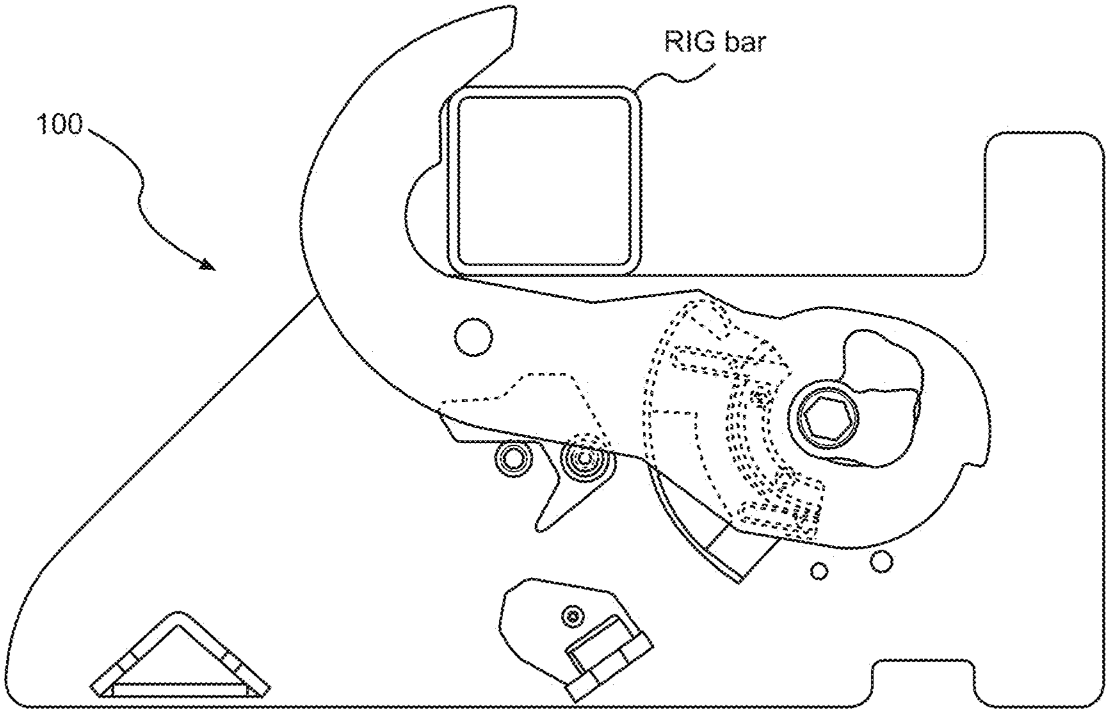
FIG. 27 shows a right side view of the first exemplary embodiment of an engaged position with a RIG wedge for a square RIG bar.

The floating hook 110 has two different extreme rotational positions within the carriage. The stored/lowest position, as shown in FIG. 24, is the location of the floating hook 110 in stored position resting atop a bumper 164. The bumper 164 is located inside a hook position ramp 163, which is further trapped in the space created between lower stop 162 and hook position ramp 163 as shown on FIG. 20. The bumper 164 also acts as a noise and impact damper when the floating hook 110 drops to its storage position. As shown in FIG. 22, the location of the floating hook 110 in the uppermost position is fixed using the upper stop bolt 165, beyond which the floating hook 110 cannot rotate. The stop surfaces 114*a* and 114*b* on the respective left- and right-side halves 111*a* and 111*b* of the floating hook 110 will act as a stop against the upper stop bolt 165.

The hook position ramp 163 guides the hook stopper 169 with a smooth rotation from the stored position to a deployed state. Once the gear motor 180 engages to raise the floating hook 110, the hook position ramp 163 forces the floating hook 110 into the engagement zone. In the event of a chain break for the gear motor 180, the floating hook 110 still lands in the zone where the hook position sensor 140 will indicate a warning inside and outside the dock. In certain embodiments when the floating hook 110 cannot be released during RIG wedge condition and the truck had to be backed up, the floating hook 110 has fallen to the hook position ramp 163, which triggers the gear motor 180 to move the floating hook 110 to a storage position.

The combination of the floating hook 110 and the left and right carriage plates 173 and 174 also includes an intermediate stop created by the interaction of transition stops with hook stoppers 169. The intermediate stop is used to keep the floating hook 110 from being lowered beyond a certain point until a user deliberately permits the floating hook 110 to lower. This is accomplished by actuating a translational movement of the floating hook 110 away from the main axis of the main shaft 138 as shown on FIG. 23. Such translational movement will cause the floating hook 110 to slide past the intermediate stop zone, allowing it to drop to the stored position. The movement and interaction of transition stops and hook stoppers 169 is entirely based on gravitational force or rotation of the main shaft 138 combined with linear movement of the floating hook 110; no additional means such as springs or hydraulic or pneumatic actuators is necessary. This allows the floating hook 110 to cycle through movement without relying on biasing means to return either the transition stops or the hook stoppers 169 to their proper positions.

In a first embodiment shown in various views and positions in FIGS. 1 through 5, 16, 17, 18, 20, 21, 22, and 23, the intermediate stop is achieved by causing transition stops 150*a* and 150*b* located on the inside surfaces of the left and right carriage plates 174 and 175 to interact with a hook stopper 169 extending from the left- and right-side hook halves 111*a* and 111*b*. In a second embodiment shown in FIG. 6, the transition stops 250*a* and 250*b* are respectively located on the left- and right-side hook halves 111*a* and 111*b* and the transition stop bolt 160 is positioned on the inside surfaces of the left and right carriage plates 174 and 175 (not shown).

Figure 16:
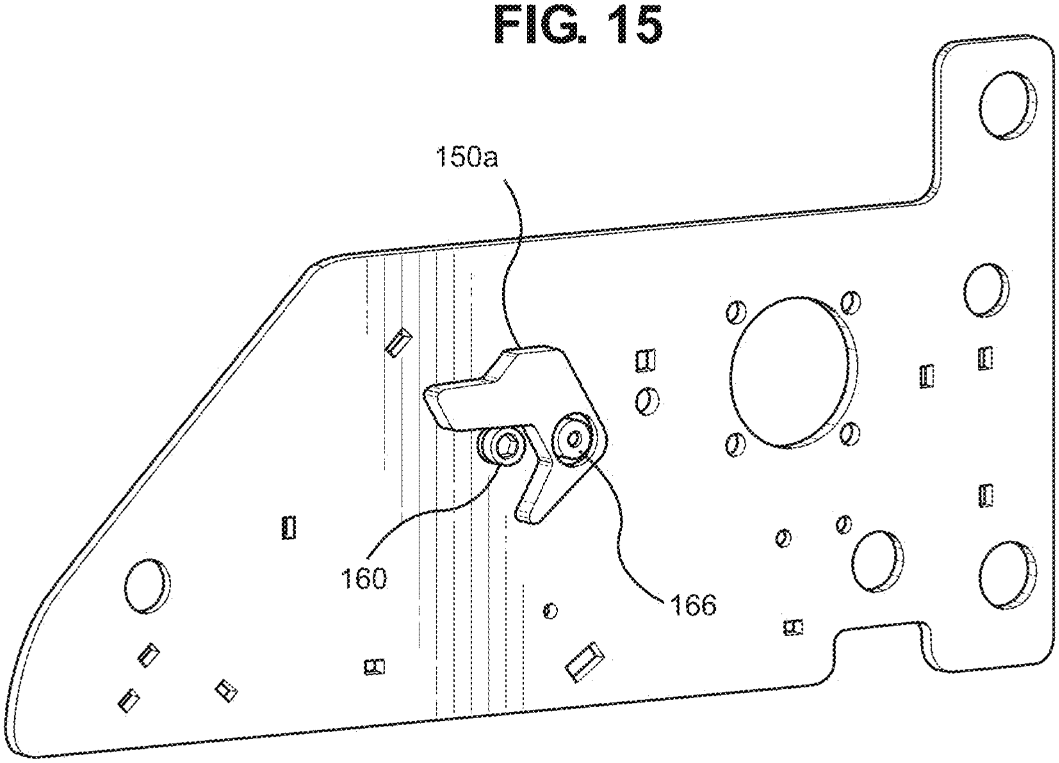
FIG. 16 shows a perspective view of the first exemplary embodiment of a transition stop with left carriage plate and stop bolts.
Figure 17:
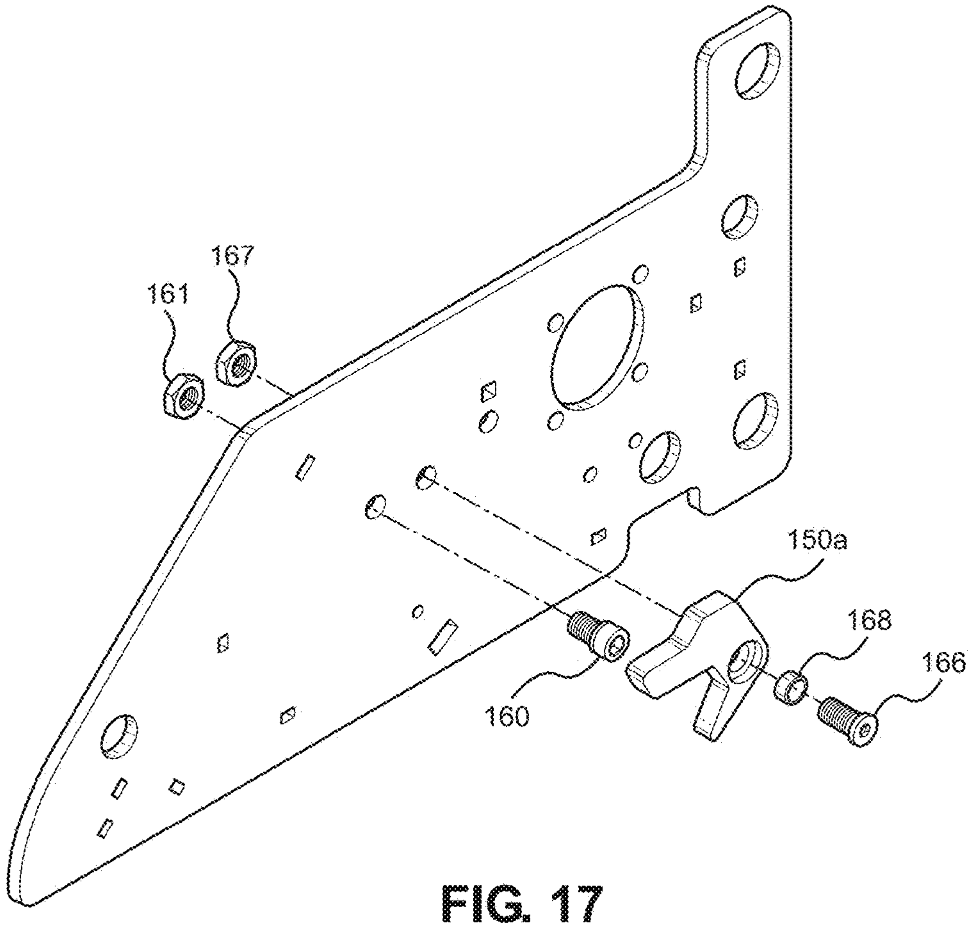
FIG. 17 shows an exploded perspective view of the first exemplary embodiment of a transition stop with left carriage plate, stop bolts, bushing and nuts.
Figure 18:
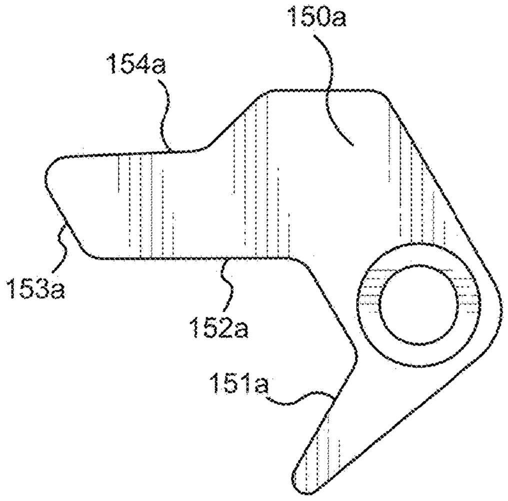
FIG. 18 shows a side view of the first exemplary embodiment of a transition stop.

As shown in FIGS. 16-18, in the first embodiment, the transition stops 150*a* and 150*b* are rotationally floating on a bushing 168 and are translationally held in place using bolts 166 and nuts 167 to the carriage plates 173 and 174. The transition stops 150*a* and 150*b* are also trapped rotationally between the transition stop bolt 160, which is held using stop bolt nuts 161 to the carriage plates 173 and 174.

Transition stop 150*b* possesses a profile identical to and a configuration mirrored from transition stop 150*a*. Transition stop 150*b* possesses the same functional surfaces as transition stop 150*a*, albeit denoted with the suffix "b" wherever applicable. Any and all descriptions of transition stop 150*a* with respect to use, function, or in reference to left carriage plate 173, left-side hook half 111*a*, and/or other elements of the system 100 may be equally applied to transition stop 150*b* with respect to use, function, or in reference to right carriage plate 174, right-side hook half 111*b*, and/or other elements of the system 100.

Figure 19:
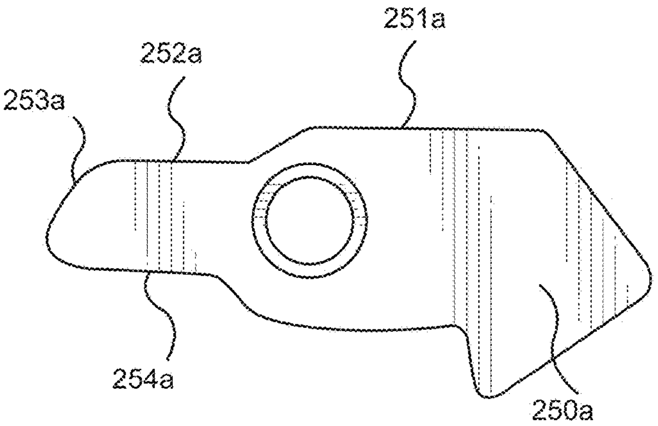
FIG. 19 shows a side view of the second exemplary embodiment of a transition stop.

As shown in the second embodiment of FIGS. 4 and 19, the transition stops 250*a* and 250*b* may also be respectively located on the left- and right-side hook halves 111*a* and 111*b*. The transition stops 250*a* and 250*b* are rotationally floating on a bushing 168 and translationally held in place using bolts 166 to the left- and right-side hook halves 111*a* and 111*b*. The hook stoppers 169 are used to stop the transition stops 250*a* and 250*b* from rotating in one direction and the load bearing stops are formed by the transition stop bolts 160 extending from the inside surfaces of the left and right carriage plates 173 and 174 in the other direction.

Transition stop 250*b* possesses a profile identical to and a configuration mirrored from transition stop 250*a*. Transition stop 250*b* possesses the same functional surfaces as transition stop 250*a*, albeit denoted with the suffix "b" wherever applicable. Any and all descriptions of transition stop 250*a* with respect to use, function, or in reference to left carriage plate 173, left-side hook half 111*a*, and/or other elements of the system 100 may be equally applied to transition stop 250*b* with respect to use, function, or in reference to right carriage plate 174, right-side hook half 111*b*, and/or other elements of the system 100.

With regard to the first embodiment, as shown in FIG. 18, the transition stop 150*a* has at least four different functional surfaces to assist smooth operation of the floating hook 110. Upward rotational stop surface 151*a* stops against the transition stop bolt 160 restricting the transition stop 150*a* from over turning upwards. Downward rotational stop surface 152*a* stops against the transition stop bolt 160 restricting the transition stop 150*a* from turning downwards. The downward rotational stop surface 152*a* also acts as a load bearing surface when the hook stopper 169 rests on it, in turn transferring the load to the transition stop bolt 160.

Figure 23:
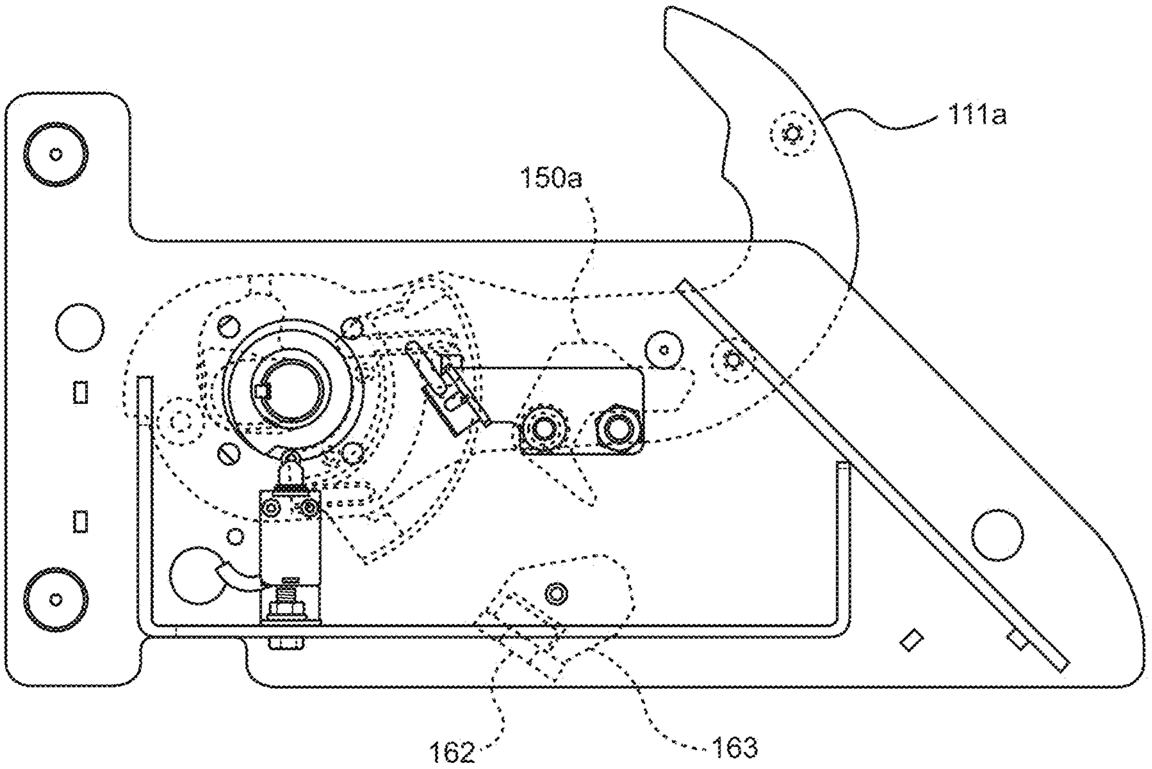
FIG. 23 shows a side view of the first exemplary embodiment of a hook on the translation stop (exactly and sliding to disengage).

Angular upward sliding surface 153*a* guides the rotation of the transition stop 150*a* when the hook stopper 169 pushes against it. This condition occurs only when the cam 120 is in the down position causing the rotational cam engagement surface 121 to rest against rotational hook engagement surfaces 112*a* and 112*b*, as shown in FIGS. 11 and 23. When the cam 120 is in up position as shown in FIGS. 12 and 28, the hook stopper 169 extends beyond and cannot slide against the angular upward sliding surfaces 153*a*.

Downward sliding surface 154*a* stops the floating hook 110 from freely rotating down. The downwards sliding surface 154*a* is active during two circumstances. First, when the floating hook 110 is engaged and no load is applied on the hook load surfaces (and hence, no RIG wedge situation), the cam 120 can freely rotate inside the hook pocket 117. Rotation of the floating hook 110 is directly linked to rotation of the cam 120 and main shaft 138, making rotational hook engagement surfaces 112*a* and 112*b* always in contact with rotational cam engagement surfaces 121. As shown in FIG. 23, this causes the hook stopper 169 to drop onto the downward sliding surface 154*a* once the floating hook 110 is on top of the transition stop 150*a*. Since the cam 120 has room to further rotate upwardly in the hook pocket 117 toward the translational hook engagement surfaces 113*a* and 113*b*, the floating hook 110 slides forward with respect to the rotational axis of the cam 120 and the longitudinal axis of the main shaft 138. This allows the hook stopper 169 to pass the transition stop 150*a*, permitting the floating hook 110 to drop and reach its stored position.

Figure 31:
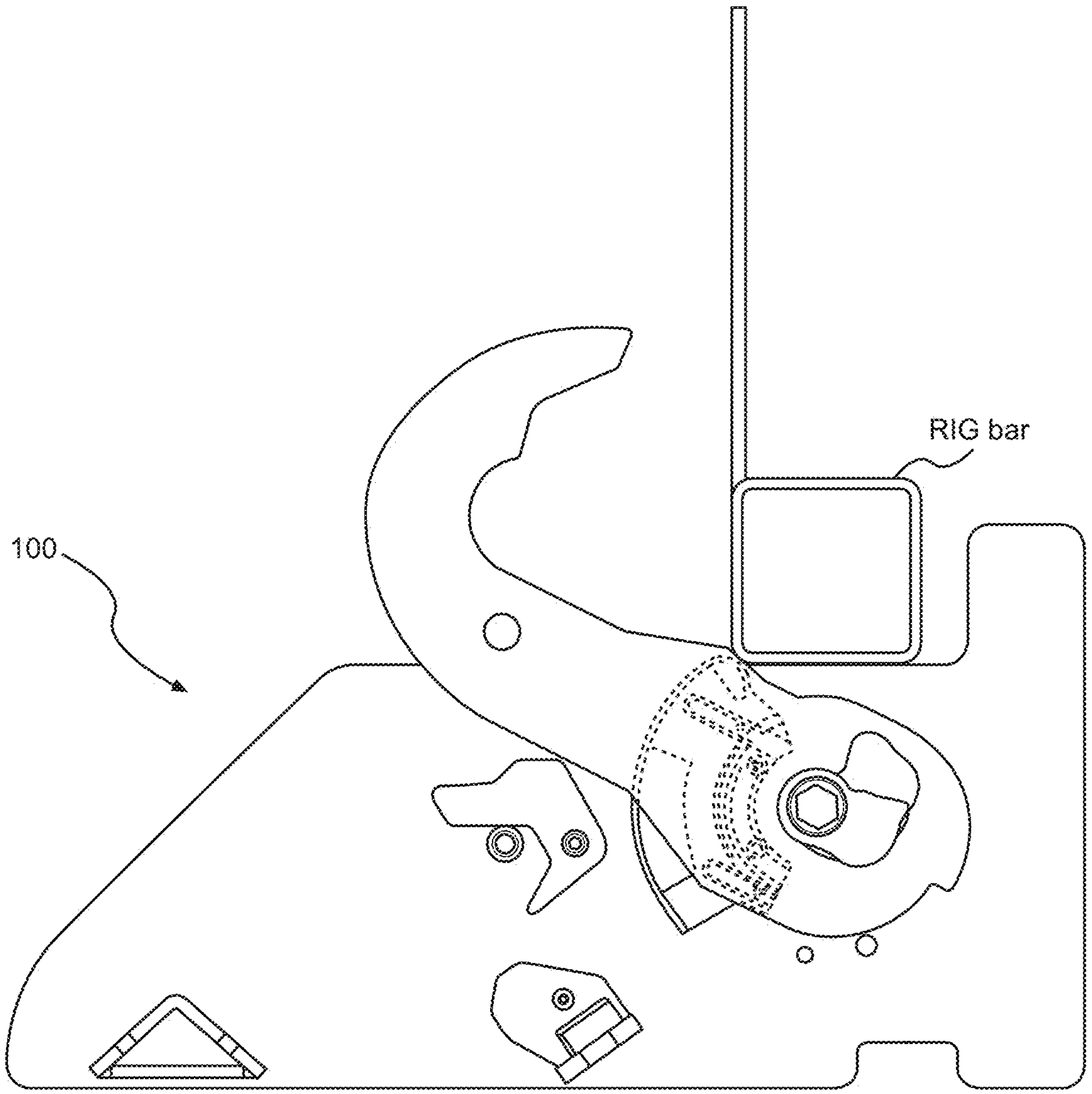
FIG. 31 shows a right side view of the first exemplary embodiment of an engaged position with a square RIG bar with a plate.
Figure 32:
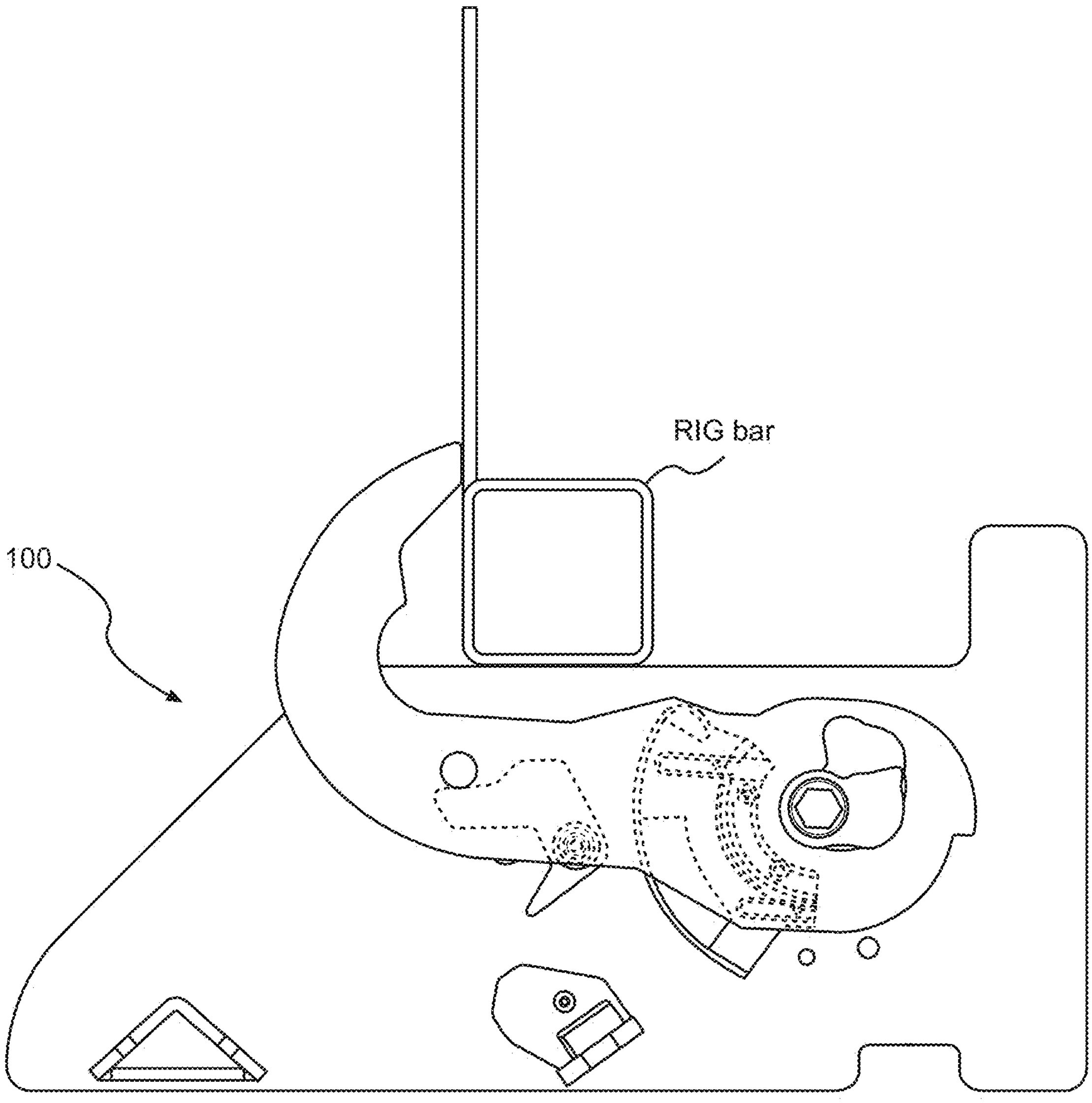
FIG. 32 shows a right side view of the first exemplary embodiment of an engaged position with a RIG wedge for a square RIG bar with a plate.
Figure 33:
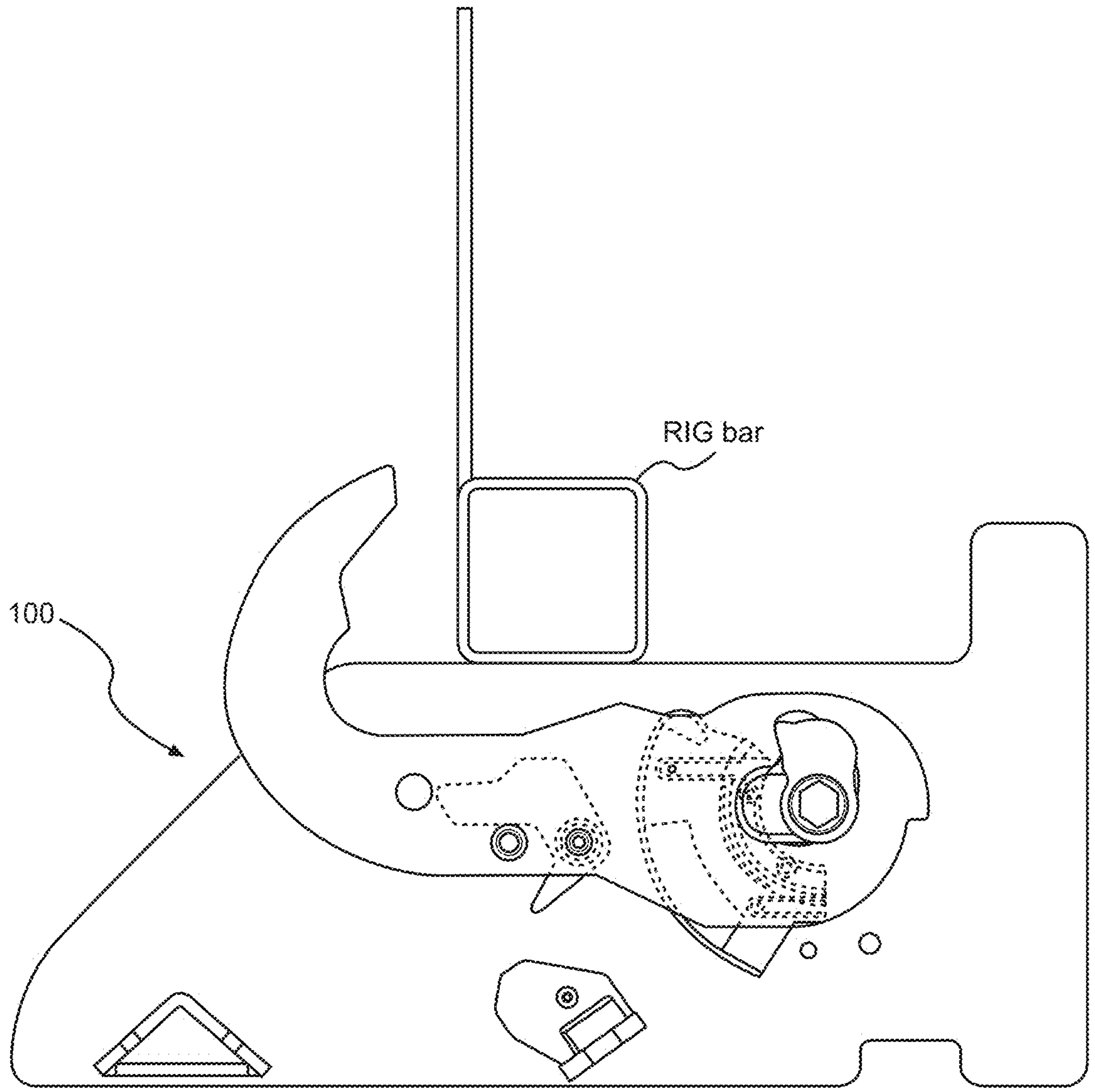
FIG. 33 shows a right side view of the first exemplary embodiment of a disengage position from RIG wedge for the square RIG bar with a plate where the hook is free to fall.
Figure 34:
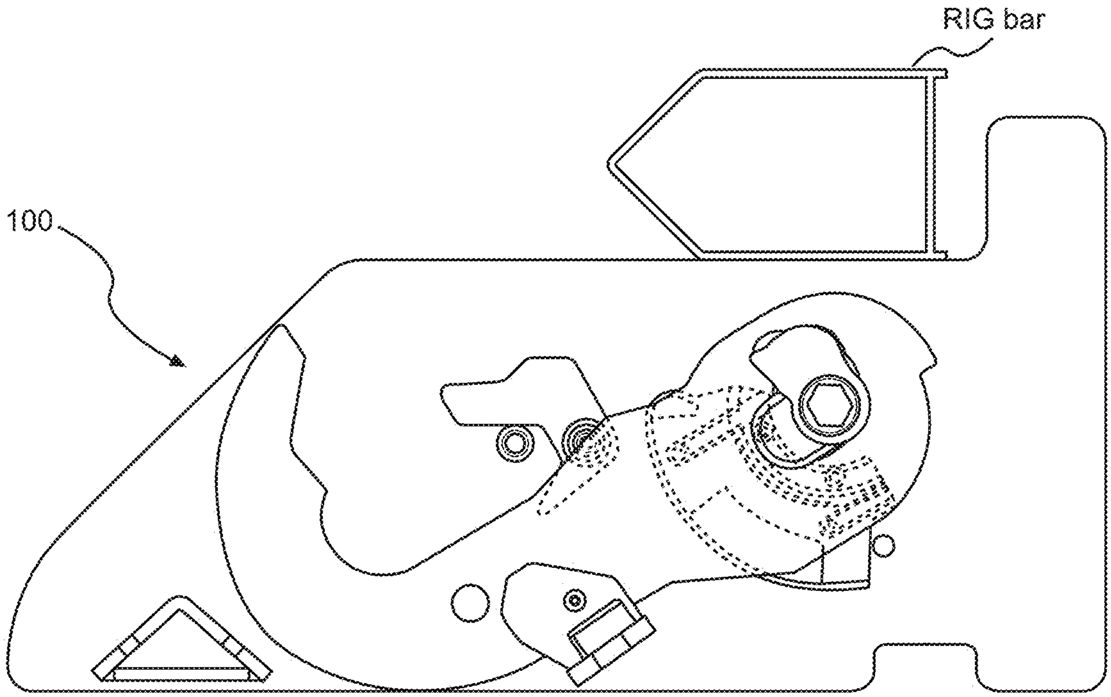
FIG. 34 shows a right side view of the first exemplary embodiment of a stored position with a penta RIG bar.
Figure 35:
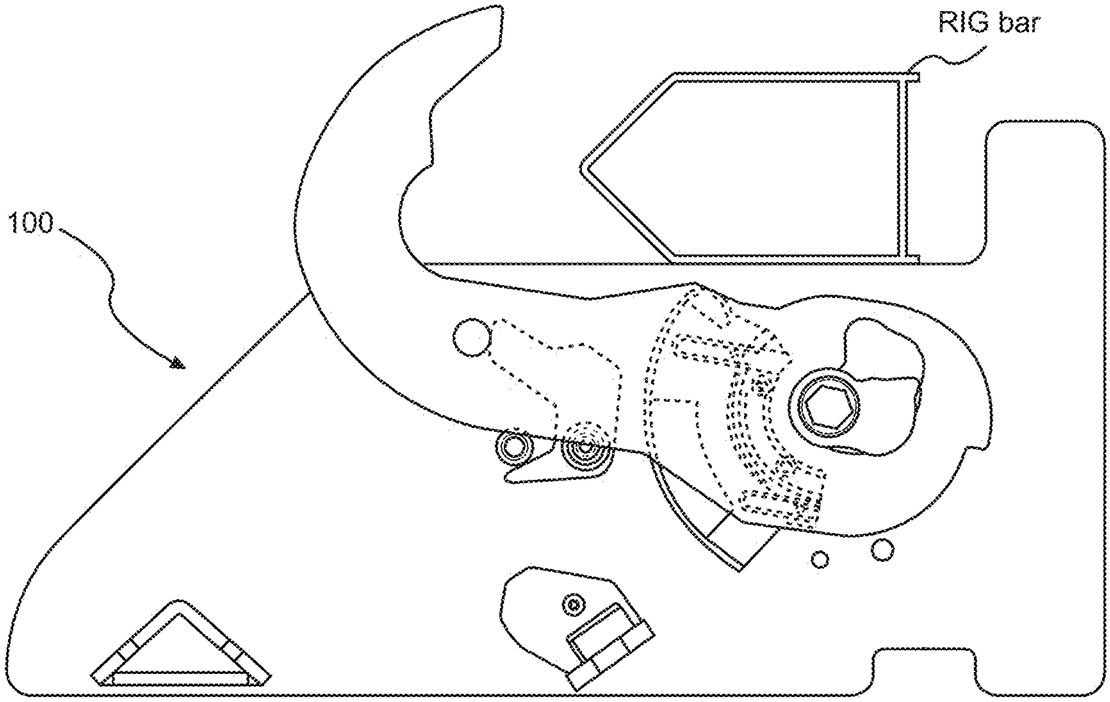
FIG. 35 shows a right side view of the first exemplary embodiment of a transition position with a penta RIG bar.
Figure 36:
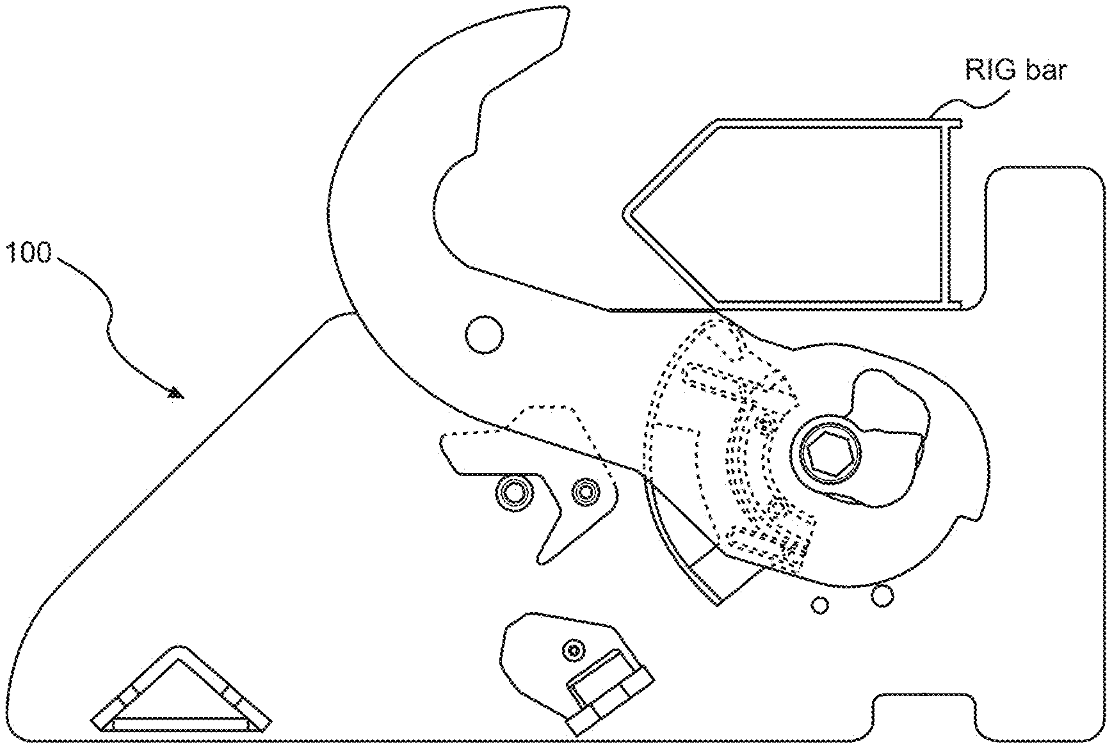
FIG. 36 shows a right side view of the first exemplary embodiment of an engaged position with a penta RIG bar.
Figure 37:
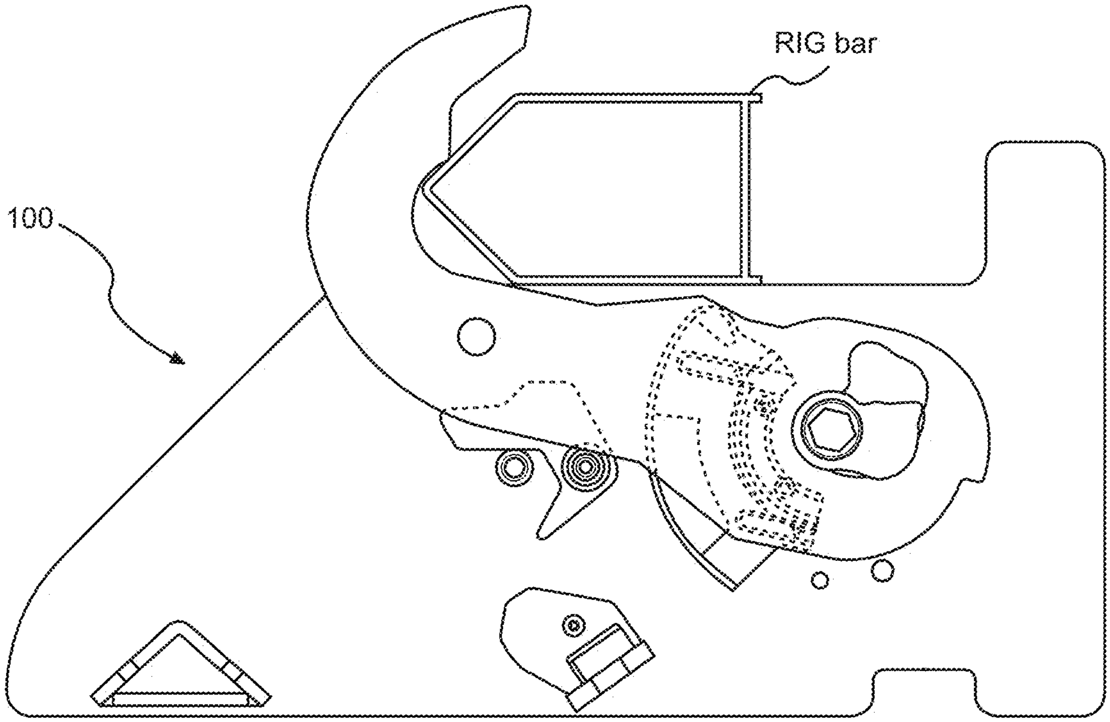
FIG. 37 shows a right side view of the first exemplary embodiment of an engaged position with a RIG wedge for penta RIG bar.

Second, when a RIG bar has a plate in front, the floating hook 110 may be pushed down during loading and unloading as shown in FIGS. 31 and 32. In this scenario, contact between the hook stopper 169 and the downward sliding surface 154*a* prevents the floating hook 110 from rotating beyond the transition stop 150*a*. The truck cannot be removed from the vehicle restraint system because downward rotation of the floating hook 110 is impossible, blocking the RIG bar and plate from disengaging with the floating hook 110 and moving away. In this case, the floating hook 110 acts as an obstruction to movement of the RIG bar, plate, and attached trailer, since the floating hook 110 has not completely rotated down and is blocked from doing so by the transition stop 150*a*.

When the floating hook 110 is engaged around a RIG bar, such as, but not limited to, a square RIG bar or a penta RIG bar, and load is applied on the hook load surfaces 116*a* and 116*b* causing it to lock in place in RIG wedge, the cam 120 rotates freely inside the hook pocket 117 from down position to up position causing the floating hook 110 to translate away from the RIG bar. This allows the floating hook 110 to release from its locked condition, as discussed above. During translation, the hook stopper 169 does not rest or slide on the downwards sliding surface 154*a*; it is free to pass the transition stop 150*a* to the stored position.

Figure 6:
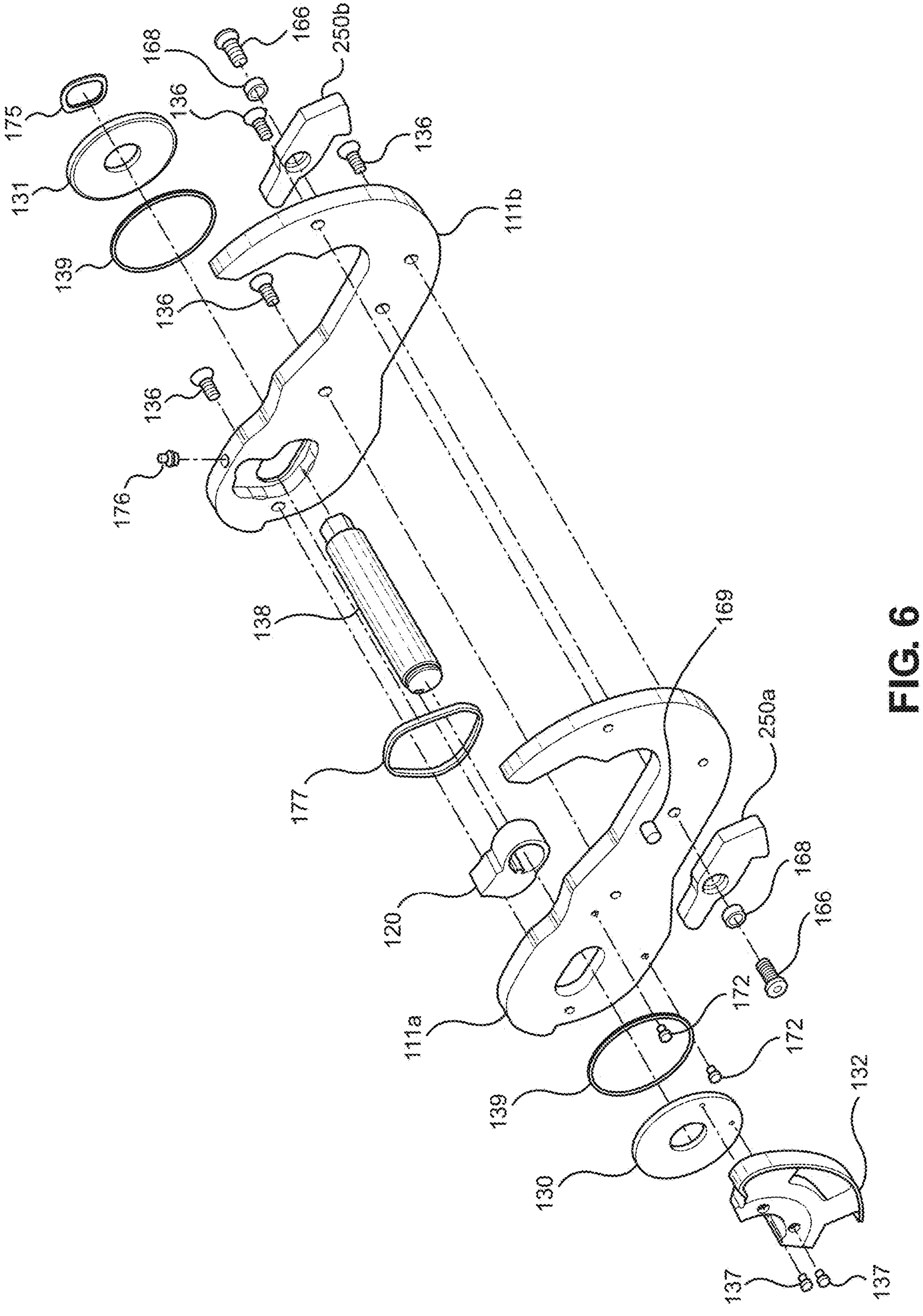
FIG. 6 shows a perspective view of the second exemplary embodiment of the floating hook sub-assembly.

With regard to the second embodiment, as shown in FIGS. 6 and 19, the transition stops 250*a* and 250*b* possess a profile altered from the first embodiment, enabling them to be connected to the floating hook 110 while still performing the same function. As shown on FIG. 19, the second embodiment of the transition stop 250*a* has the same four different functional surfaces as the first embodiment, but configured differently. Upward rotational stop surface 251*a* stops against the hook stopper 169, thereby restricting the transition stop 250*a* from over turning as they move upwards. Downward rotational stop surface 252*a* stops against the hook stopper 169, thereby restricting the transition stop 250*a* from over turning as it moves downwards.

Figure 7:
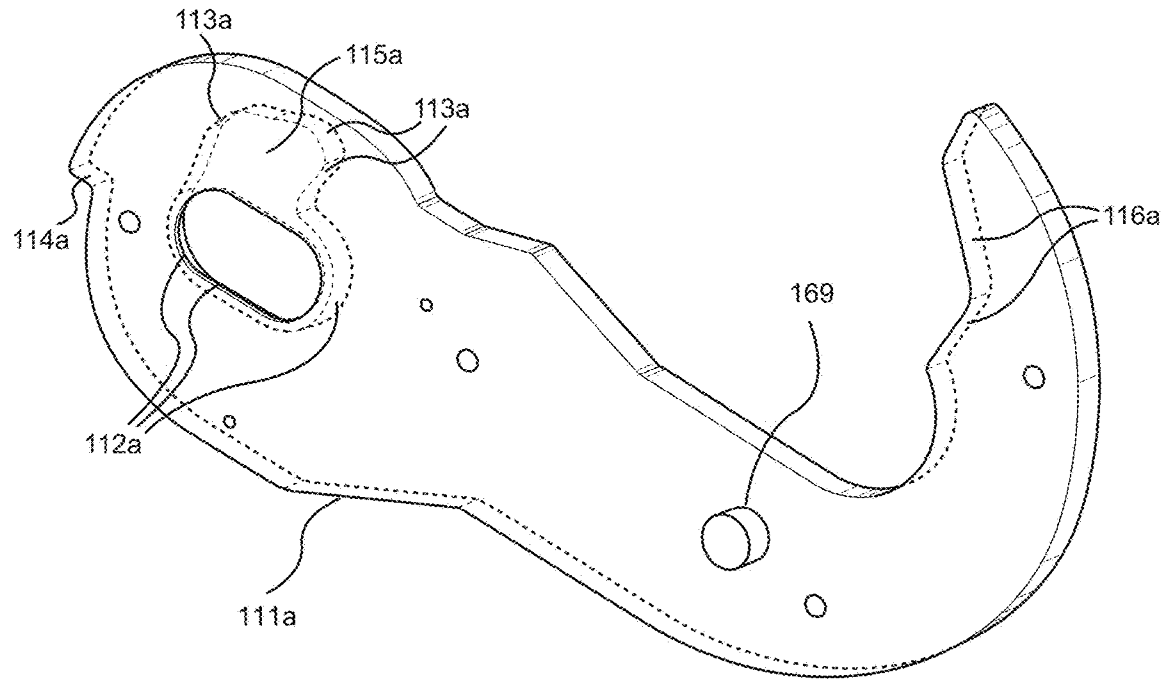
FIG. 7 shows a perspective view of the first exemplary embodiment of a left side hook.
Figure 8:
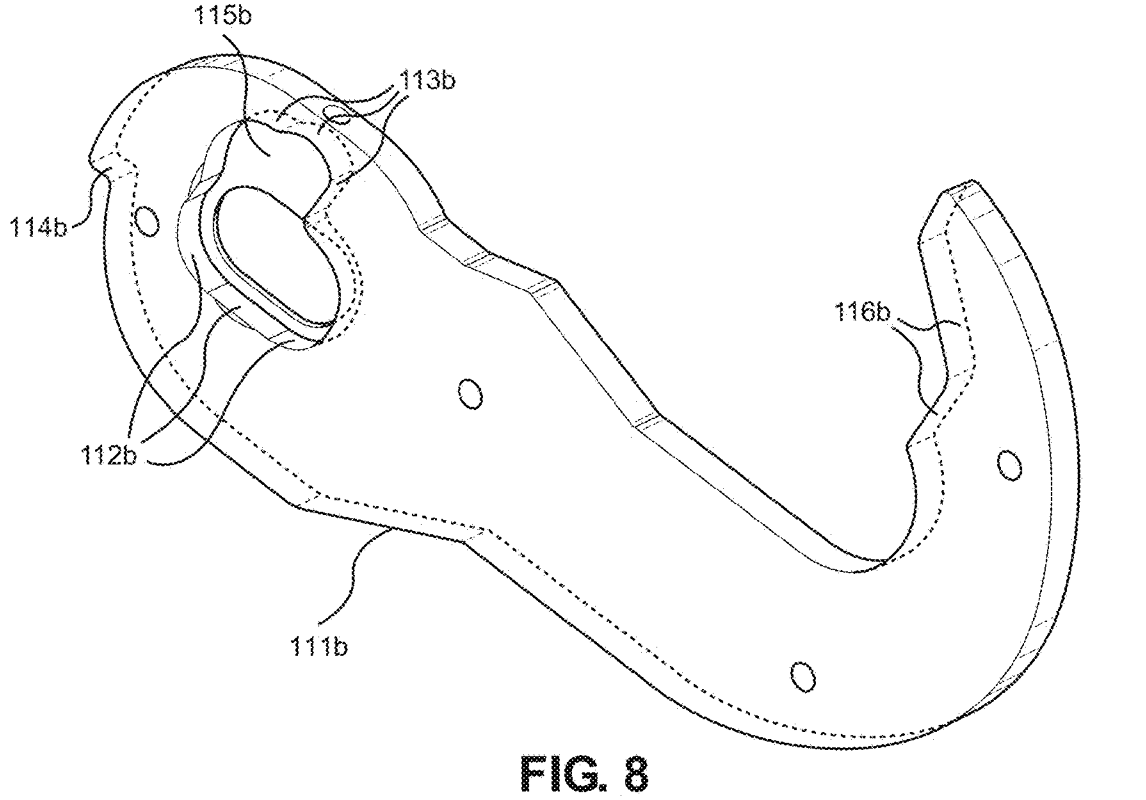
FIG. 8 shows a perspective view of the first exemplary embodiment of a right side hook.
Figure 9:
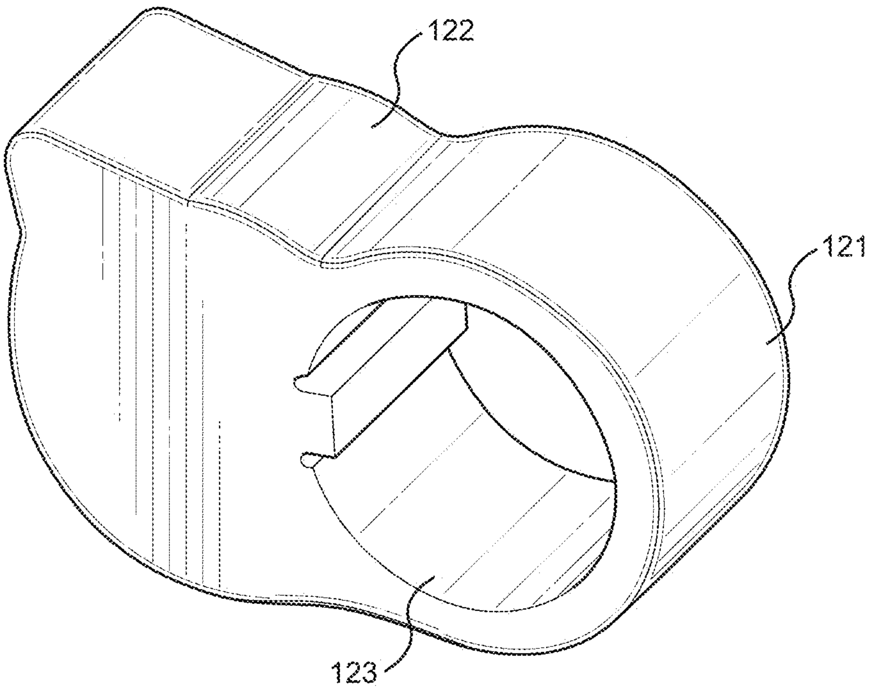
FIG. 9 shows a perspective view of the first exemplary embodiment of a cam.
Figure 10:
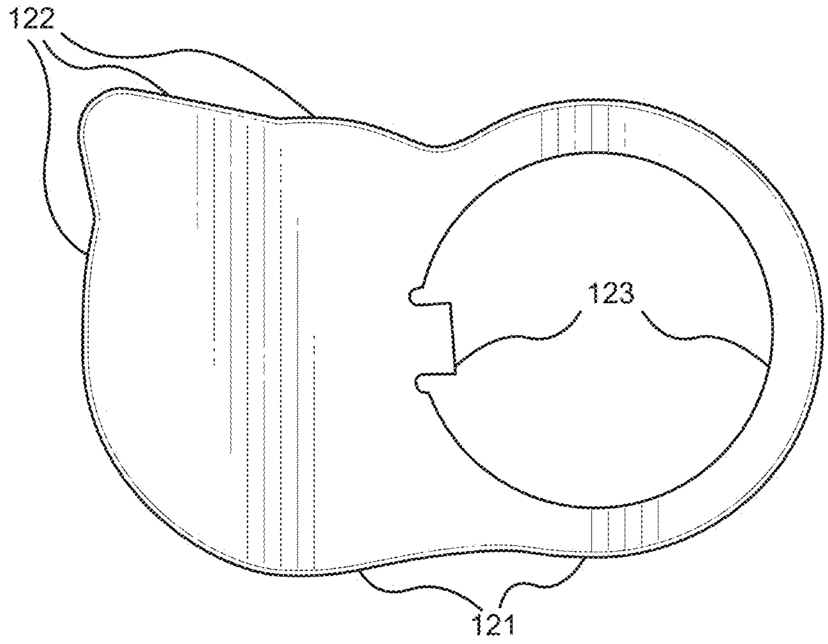
FIG. 10 shows a side view of the first exemplary embodiment of the cam.

Angular upward sliding surface 253*a* guides the rotation of the transition stop 250*a* when the transition stop bolt 160 pushes against it. This is only possible when the cam 120 is in the down position causing the rotational cam engagement surfaces 121 to rest against rotational hook engagement surface 112*a* and 112*b*, as shown in FIGS. 7 and 11. When the cam 120 is in up position as shown in FIG. 12, the transition stop bolt 160 does not slide against the angular upward sliding surface 253*a*.

Downward sliding surface 254*a* stops the floating hook 110 from freely rotating down. The downwards sliding surface 254*a* is active during two circumstances. First, when the floating hook 110 is engaged and no load is applied on the hook load surfaces (and hence, no RIG wedge situation), the cam 120 can freely rotate inside the hook pocket 117. Rotation of the floating hook 110 is directly linked to rotation of the cam 120 and main shaft 138, making rotational hook engagement surface 112*a* and 112*b* always in contact with rotational cam engagement surfaces 121. This causes the downward sliding surface 254*a* to drop onto the transition stop bolt 160, once the floating hook 110 and the transition stop 250*a* is on top of the transition stop bolt 160. Since the cam 120 has room to further rotate upwardly in the hook pocket 117 toward the translational hook engagement surfaces 113*a* and 113*b*, the floating hook 110 slides forward with respect to the rotational axis of the cam 120 and the longitudinal axis of the main shaft 138. This allows the transition stops on the floating hook 110 to pass the transition stop bolt 160, permitting the floating hook 110 to drop and reach its stored position.

Second, when a RIG bar has a plate in front, the floating hook 110 may be pushed down during loading and unloading as shown in FIGS. 31 and 32. In this scenario, contact between the hook stopper 169 and the downward sliding surface 254*a* prevents the floating hook 110 from rotating beyond the transition stop bolt 160. The truck cannot be removed from the vehicle restraint system because downward rotation of the floating hook 110 is impossible, blocking the RIG bar and plate from disengaging with the floating hook 110 and moving away. In this case, the floating hook 110 acts as an obstruction to movement of the RIG bar, plate, and attached trailer, since the floating hook 110 has not completely rotated down and is blocked from doing so by the transition stop 250*a*.

When the floating hook 110 is engaged around a RIG bar, such as, but not limited to, a square RIG bar or a penta RIG bar, and load is applied on the hook load surfaces 116*a* and 116*b* causing it to lock in place in RIG wedge, the cam 120 rotates freely inside the hook pocket 117 from down position to up position causing the floating hook 110 to translate away from the RIG bar. This allows the floating hook 110 to release from its locked condition, as discussed above. During translation, the downwards sliding surface 254*a* does not rest on the transition stop bolt 160; it is free to pass the transition stop bolt 160 to the stored position.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and/or method steps described herein may be used alone or in combination with other configurations, systems and/or method steps. It is to be expected that various equivalents, alternatives and/or modifications are possible within the scope of the appended claims.

What is claimed is:

1. A vehicle restraining hook system, comprising:
- a carriage with a rotatable shaft extending therethrough;
- a cam rotatably fixed to the shaft; and
- a floating hook subassembly comprising a left-side hook half and a right-side hook half,
- wherein each of the left-side hook half and the right-side hook half comprises hook load surfaces configured to contact a RIG bar at a first end, and a void configured to receive the cam at a second end,
- wherein the void of the left-side hook half and the void of the right-side hook half form a single continuous hook pocket configured to retain the cam but allow the hook shaft to extend therethrough,
- wherein the floating hook subassembly is rotatable relative to the carriage about the rotatable shaft in an engaging direction and a disengaging direction,
- wherein the cam is rotatable within the hook pocket such that rotation of the cam causes linear motion of the floating hook subassembly.

2. The system of claim 1, wherein the hook pocket has an approximately L-shaped configuration.

3. The system of claim 1, wherein the cam is capable of rotating within the hook pocket through a range of approximately 90 degrees.

4. The system of claim 1, wherein an inner periphery of the hook pocket and an outer periphery of the cam are configured to allow the cam to rotate while having positive contact with at least two surface points of the hook pocket at a starting position and at an end position.

5. The system of claim 1, further comprising an intermediate stop comprising at least one transition stop mounted to one of the carriage or the floating hook subassembly and at least one hook stopper mounted to the other of the carriage or the floating hook subassembly.

6. The system of claim 5, wherein the at least one transition stop is rotatable relative to the carriage or the floating hook subassembly, wherein the at least one transition stop comprises at least four different functional surfaces.

7. The system of claim 5, wherein the at least one transition stop comprises at least one upward rotational stop surface configured to stop against the at least one transition stop thereby restricting the at least one transition stop from over turning upwards.

8. The system of claim 5, wherein the at least one transition stop comprises at least one downward rotational stop surface configured to stop against the at least one transition stop thereby restricting the at least one transition stop from turning downwards.

9. The system of claim 5, wherein the at least one transition stop comprises at least one angular upward sliding surface configured to guide the rotation of the transition stop when the at least one hook stopper pushes against the at least one transition stop.

10. The system of claim 5, wherein the at least one transition stop comprises at least one downward sliding surface configured to stop the hook from freely rotating down.

11. The system of claim 1, further comprising at least one hook position sensor acting as an indicator for at least one position of the hook.

12. The system of claim 1, wherein a safe hook position sensor is triggered when the hook has deployed enough to clear at least one transition stop.

13. The system of claim 11, further comprising a gear motor configured to automatically rotate the hook to a stored position when the at least one hook position sensor detects an incomplete safe engagement condition or when a truck and/or RIG bar is not present.

14. The system of claim 11, further comprising a hook position indicator rotationally locked to the rotational orientation of the hook.

15. The system of claim 14, wherein the hook position indicator comprises a plurality of transition points that trigger the at least one hook position sensor.

16. The system of claim 14, wherein translational movement of the hook causes the hook position indicator to rotate without translation due to a plurality of channels in the hook position indicator.

17. The system of claim 1, further comprising a left side plate and a right side plate holding the left-side hook half and the right-side hook half together.

18. The system of claim 17, further comprising at least one hook split gasket acting as a seal for lubrication within the hook pocket.

19. The system of claim 1, further comprising a bumper acting as a noise and impact damper when the floating hook drops to its storage position.

20. The system of claim 1, further comprising a hook position ramp, wherein a gear motor is automatically triggered to move the hook to a storage position when the hook has fallen to the hook position ramp.

* * * * *